United States Patent [19]
Phillips

[11] Patent Number: 4,956,590
[45] Date of Patent: Sep. 11, 1990

[54] VEHICULAR POWER STEERING SYSTEM
[75] Inventor: Edward H. Phillips, Middletown, Calif.
[73] Assignee: Techco Corporation, New York, N.Y.
[21] Appl. No.: 254,968
[22] Filed: Oct. 6, 1988
[51] Int. Cl.$^5$ .......................... G05B 11/10; B62D 5/04
[52] U.S. Cl. .................................. 318/432; 318/489; 318/293; 180/142; 180/79
[58] Field of Search .................. 318/2, 15, 85, 139, 318/293, 432, 434, 487, 488, 489, 586, 616; 180/79, 79.1, 141, 142

[56] References Cited
U.S. PATENT DOCUMENTS

| 4,629,952 | 12/1986 | Shimizu | 318/432 |
| 4,639,651 | 1/1987 | Shimizu | 318/432 |
| 4,687,976 | 8/1987 | Shimizu | 318/432 |
| 4,688,655 | 8/1987 | Shimizu | 180/79.1 |
| 4,715,461 | 12/1987 | Shimizu | 180/79.1 |
| 4,727,950 | 3/1988 | Shimizu et al. | 180/79.1 |
| 4,730,686 | 3/1988 | Shimizu | 180/79.1 |
| 4,735,271 | 4/1988 | Shimizu | 318/432 X |
| 4,754,829 | 7/1988 | Shimizu | 180/79.1 |
| 4,756,376 | 7/1988 | Shimizu | 318/489 X |
| 4,800,975 | 1/1989 | Oshita et al. | 180/79.1 X |
| 4,819,170 | 4/1989 | Shimizu | 180/79.1 X |

Primary Examiner—William M. Shoop, Jr.
Assistant Examiner—Paul Ip
Attorney, Agent, or Firm—Harness, Dickey & Pierce

[57] ABSTRACT

A steering assembly for multiplying steering torque and motion applied from a steering wheel of a vehicle by fixed and selectively varying ratios, respectively. The applied steering torque and motion are coupled via an input shaft to a sun gear of a planetary gear set. Supplementary torque and steering motion are generated by a servo motor which is coupled to a ring gear of the planetary gear set via an irreversible differential planetary gear set. Rotational motion of the input shaft is determined and rotational motion of the servo motor is controlled as a selected function of the rotational motion of the input shaft. Actual rotational motion of the servo motor is measured and additional rotational motion of the servo motor is terminated if the actual rotational motion of the servo motor does not substantially match the selected rotational motion. A set of planetary gears mounted in a planetary carrier receives combined output torque and rotational motion from both the sun and ring gears. The planetary carrier is coupled to an output shaft which delivers the output torque and rotational position to a steering gear.

1 Claim, 18 Drawing Sheets

VEHICULAR POWER STEERING SYSTEM

TECHNICAL FIELD

This invention relates generally to vehicular power steering systems and particularly to electronically controlled and electrically actuated vehicular power steering systems as opposed to commonly available hydraulically actuated vehicular power steering systems.

BACKGROUND AND SUMMARY OF THE INVENTION

Commonly available hydraulically actuated vehicular power steering systems lack tactile force feedback that is representative of net steering effort required by a vehicle There are two reasons for this phenomenon. First, due to various additional seals and the like, gross supplemental steering effort provided by such a system must overcome increased system friction in addition to providing a required level of net supplemental steering effort. Second, the gross supplemental steering effort is determined by deflection of a control valve which is only partially sensitive to the gross supplemental steering effort provided by the system.

The deflection of the control valve is determined by rotational deflection of a torsion bar which deflects proportionally with torque applied to a steering wheel of the vehicle This is unsatisfactory because the control valve is nominally a flow control device as opposed to a force control device. Thus a driver of the vehicle receives tactile force feedback that first relates to overcoming the increased system friction noted above and then steering motion (velocity) rather than the net steering effort required by the vehicle.

Commonly available hydraulically actuated vehicular power steering systems are also subject to catastrophic failure should a pump drive belt break or a hydraulic line or any system component fail. While manual steering is still possible when such a system is inoperative, apparent steering effort is greatly increased. In fact, the apparent steering effort required is significantly greater than that required by an otherwise identical vehicle equipped with manual steering. This is due to the necessity of overcoming the increased system friction noted above as well as moving hydraulic fluid against system hydraulic impedance. Such a catastrophic failure could be dangerous depending on other factors involved. For instance, a person having limited physical strength could have difficulty controlling a vehicle suffering such a catastrophic failure in a tight turn on a mountain road.

Typical hydraulically actuated vehicular power steering systems are extremely inefficient. This is because the type of pump commonly utilized in such a system is a constant displacement pump that is subject to a wide range of rotational speeds (because it is coupled directly to the vehicle's engine) while it pumps against system pressure. Even though excess hydraulic fluid is returned to a reservoir by a flow control valve, system power consumption is high whenever the vehicle's engine is operated above idle speed.

Recently, "electronically controlled" hydraulic power steering systems have become commercially available. The function of such a system is to increase apparent steering effort concomitant with increased vehicular speed. This is accomplished by utilizing an additional motor driven flow control valve which is used to siphon off a portion of hydraulic fluid flow. This serves to reduce system gain at higher vehicular speeds.

A number of electronically controlled and electrically actuated vehicular power steering systems have been described in recently issued U.S. and foreign patents. Many of these new power steering systems are said to achieve a quasi-linear operation characteristic wherein gross supplemental steering effort is related to applied steering effort. This is usually accomplished by utilizing a computer controlled electrical servo system which provides gross supplemental steering effort via an electrical servo motor drive. In the majority of these systems, the servo motor is coupled to a vehicle's steering system via mechanical means and rotates concomitantly with the vehicle's steering wheel with a linear rotational position relationship therebetween.

Most of these systems achieve control of gross supplemental steering effort via measuring torque that is applied to the vehicle's steering wheel and driving the servo motor with the computer controlled electronic servo system in a manner that is dependent upon the measured torque. This is done such that the quasi-linear operation characteristic is attained.

Many of the above mentioned patents describing electronically controlled and electrically actuated vehicular power steering systems have not included means for detecting failures of measurement devices, control electronics or actuating elements. Nor have they provided for fail-safe mechanical operation in the event of such failures. Such failure detection and fail-safe operation are minimum requirements for any commercially produced power steering systems.

Two electronically controlled and electrically actuated vehicular power steering systems that incorporate failure detection means are described in U.S. Pat. Nos. 4,660,671 and 4,715,463 entitled ELECTRIC STEERING GEAR and ELECTRIC POWER STEERING SYSTEM FOR VEHICLES, respectively. In these systems, computer controlled electronic sub-systems are used to analyze output signals from various sensors to provide failure detection. Should such analysis detect any system failure, electrical drive to the servo motor is disabled and mechanical steering is possible.

Since the servo motor in each of these systems is mechanically coupled to its respective steering system in a linearly related manner, applied steering effort required for manual operation thereof must additionally rotate all of the power steering elements. This means that the applied steering effort required for such manual operation will be greater than that required for an otherwise similar vehicle equipped with manual steering.

Two vehicular steering systems that comprise variable ratio steering are described in U.S. Pat. Nos. 4,739,855 and 4,751,976 entitled VEHICLE STEERING SYSTEM HAVING A STEERING RATIO CHANCING MECHANISM and STEERING SYSTEM FOR AUTOMOTIVE VEHICLE OR THE LIKE, respectively. In U.S Pat. No. 4,739,855, a steering ratio changing mechanism is described that increases steering ratio concomitantly with increasing vehicular speed.

The steering ratio changing mechanism incorporated therein is a planetary gear set that is utilized in a differential manner. In this planetary gear set, the vehicle's steering wheel is directly coupled to its sun gear, a stepping motor is directly coupled to its planetary carrier, and its ring gear is utilized to drive the vehicle's steering gear. The effective steering ratio varies from a relatively low ratio wherein a moderate rate of drive pulses is delivered to the stepping motor to a high ratio wherein a high rate of drive pulses is delivered to the stepping motor. Rotation of the ring gear is a function of stepping motor driven planetary carrier rotation less a function of steering wheel driven sun gear rotation. Thus, if the stepping motor or its drive circuit should fail, the ring gear will rotate in a direction opposite from the direction of rotation of the vehicle's steering wheel.

The variable steering ratio mechanism described above is said to be dependent upon a hydraulically actuated power steering system which is also disclosed. This allows the front wheels to be held at a turned position by a small force. Thus, the required holding force of the stepping motor may be relatively small. No provision is made for manual steering in the event of failure of the hydraulically actuated power steering system.

In U.S. Pat. No. 4,751,976, a variable ratio steering system is described wherein a differential planetary gear set is utilized to additively couple rotational inputs from the vehicle's steering wheel and a variable speed motor. These coupled rotational inputs drive the vehicle's steering gear.

In a first embodiment, the differential planetary gear set is an external differential planetary gear set wherein the steering wheel is directly coupled to a first sun gear of the gear set, the gear set's planetary carrier is driven by the variable speed motor, and a second sun gear of the gear set is used to drive the output shaft. In other embodiments, the differential planetary gear set is an internal differential planetary gear set wherein first and second ring gears are substituted for the first and second sun gears, respectively. In the various embodiments, gear ratios between the first sun or ring gear and the second sun or ring gear range between 0.9:1 and 1.1:1. Thus, these variable ratio steering systems substantially do not provide torque assistance.

Although it is commonly alleged that computer control of complex control functions (such as those described above) can be achieved with a relatively simple electronic sub-system, such is often not the case. This is because the computer does not work alone in providing control. Various sensor, analog-to-digital converter, digital-to-analog converter, memory and other support devices are also required. Thus, such electronic sub-systems can get very complex. In addition, software development for such computer controlled electronic sub-systems is difficult and time consuming. Furthermore, it is difficult to get such computer controlled electronic sub-systems to operate with a cycle rate that is fast enough so that overall system operation is not severely compromised.

It would be desirable to provide an electronically controlled and electrically activated vehicular power steering system wherein electronically controlled variable ratio steering, significant torque assistance and fail-safe safety systems are all incorporated. The fail-safe safety system should detect any system malfunction by simply measuring actual output parameters, comparing them with desired output parameters and disabling system drive should excessive variation occur therebetween. There should be no increase in apparent steering effort when the system drive is disabled and manual steering is undertaken. There should be a linear relationship between apparent steering effort and actual steering effort at all times. Further, It would be desirable to provide such an improved electronically controlled and electrically actuated vehicular power steering system wherein no interactive computer control is required.

Another steering system, which was disclosed in Japanese patent application First Provisional Publication No. 47-20835, was cited in U.S. Pat. No. 4,751,976. In that steering system, a steering shaft is formed in first and second sections which are interconnected by differential gearing comprising a planetary gear set. In a first embodiment of this planetary gear set, the vehicle's steering wheel is directly connected to its sun gear, a motor drives its ring gear, and its planetary carrier drives the vehicle's steering gear.

In U.S. Pat. No. 4,751,976 this steering system is said to be unsatisfactory because "it is necessary to provide a reduction gear such as a worm gear arrangement between the motor and the element of the differential gear via which the auxiliary power input is achieved . . . the provision of this gearing causes the system to become heavy and bulky thus causing design difficulties when trying to incorporate such a system into the confines of an automotive vehicle."

However, electronically controlled variable ratio steering is possible with such differential gearing. And, all members of the planetary gear set rotate in the same direction. Further, the reduction gear ratio between the sun gear and the planetary carrier results in significant steering torque assistance wherein a linear torque relationship between apparent and actual steering efforts is guaranteed. A fail-safe safety system can be effected wherein servo motor rotation is precluded and an increase in steering ratio obviates any increase in steering effort.

In accordance with the present invention, an improved electronically controlled and electrically actuated vehicular power steering system (hereinafter called an improved power steering system) is provided wherein a compact mechanical drive featuring planetary reduction gearing is utilized for coupling a servo motor to such a planetary gear set. The electromechanical components of the improved power steering system are mounted concentrically with respect to the steering shaft or, alternately, concentrically about a pinion gear axis within a portion of a housing of a rack and pinion gear set of the improved power steering system.

In normal operation of the improved power steering system, redundant first and second sets of shaft angle transducers measure angular positions of the steering shaft and the servo motor. In each of the first and second sets of shaft angle transducers, first and second shaft angle transducers measure the angular positions of the steering shaft and the servo motor, respectively. The values of the signals from the first (or data) set of first and second shaft angle transducers are utilized for data input to an electronic servo system. The electronic servo system drives the servo motor such that the position of the servo motor and gear train track the position of the steering shaft according to a preselected function of the value of the signal from the first shaft angle encoder. Then both the steering shaft and the gear train rotate and additively provide vehicular steering motion as desired.

The second set of first and second shaft angle transducers is utilized to provide a continuous verification of system function. This is done by comparing the value of the signal from the second shaft angle transducer of the second (or measurement) set of shaft angle transducers with the value determined according to the same preselected function of the value of the signal from the first shaft angle encoder. If these values are excessively in variance, then a fail-safe safety system is activated.

On the other hand, if one of the steerable wheels is jammed (such as against a curb) and current applied to the servo motor becomes excessive, a current-limiting circuit concomitantly suppresses the value of the signal from the first shaft angle transducer of each set of shaft angle transducers. This serves to suppress the output of the electronic servo system and limit the current that is applied to the servo motor to a safe value. Since the value of the signal from the second shaft angle transducer of the measurement set of shaft angle transducers continues to match the value determined according to the preselected function of the suppressed value of the signal from the first shaft angle transducer of the measurement set of shaft angle transducers, the fail-safe safety system is not activated in the current limiting mode of operation.

Variable steering ratio capability is provided via the preselected function. This is accomplished by varying angular motion of the servo motor as a function of vehicular speed so that the apparent steering ratio smoothly varies from a minimum value at low vehicle speeds to a maximum value at high vehicle speeds. This is done by concomitantly suppressing the values of each of the signals from the first shaft angle transducers of each of the first and second sets of shaft angle transducers according to a pre-selected function of vehicular speed.

In a first embodiment of the improved power steering system, the servo motor is coupled to the ring gear via non-reversible (self-locking) gearing. A fail-safe safety system, which includes a contactor that electrically disconnects the servo motor and places a line fault across its armature windings, precludes servo motor rotation when activated. Thus, the ring gear is held stationary and manual steering can be accomplished with no apparent change in steering effort at an increased mechanical steering ratio.

In another embodiment of the improved power steering system, the servo motor is coupled to the ring gear via reversible gearing. A modified fail-safe safety system, which additionally includes a fail-safe servo motor brake, similarly precludes servo motor rotation when activated. Thus, the ring gear is held stationary and manual steering can be accomplished with no apparent change in steering effort at an increased mechanical steering ratio.

All electronic control functions of either embodiment of the improved power steering systems are carried out in real time by analog electronic circuits. No computer is used therewith.

DESCRIPTION OF THE PREFERRED EMBODIMENTS

Figure 1:
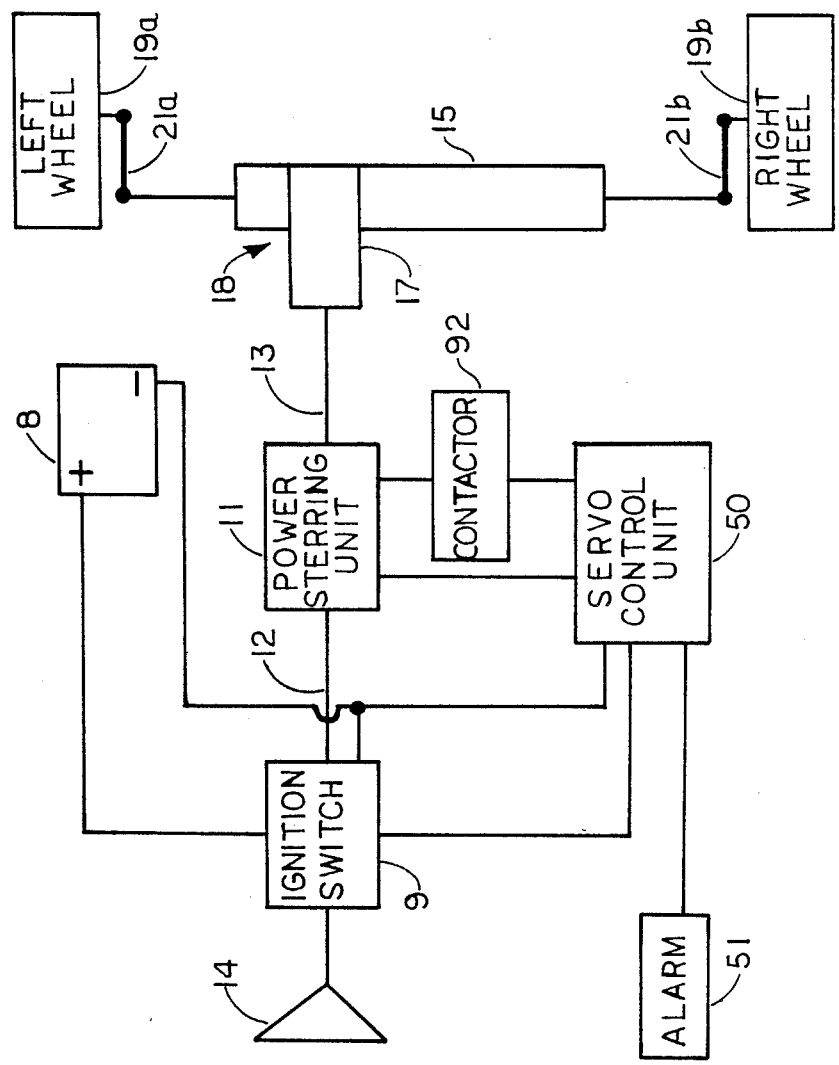
FIG. 1 is a plan view and block diagram of an improved power steering system of the present invention.

Shown in FIG. 1 is a plan view and block diagram of an improved power steering system 10, which is made operational by turning on an ignition switch 9. This applies electrical power from a battery 8 to a servo control unit 50 and releases a steering wheel 14, thus allowing torque inputs to be applied via an upper steering shaft 12. A power steering unit 11 additively couples the torque inputs from the upper steering shaft 12 with torque inputs from a servo motor 16 which is located within the power steering unit 11. These additively coupled torque inputs are applied to a steering gear 18 via a lower steering shaft 13. Because additional torque is generated within the power steering unit 11, it is physically coupled to a vehicular structure (not shown) to provide opposing reaction torque. (One typical method of providing such physical coupling would be to mount the power steering unit within the steering gear 18 thus utilizing the lower steering shaft 13 as an input shaft of the steering gear 18.)

The steering gear 18 may comprise an input pinion gear of a rack and pinion unit 15 as shown in FIG. 1, or it may comprise input portions of worm-and-roller or recirculating-ball steering mechanisms (neither shown). The power steering unit 11 may be located remotely from the steering gear 18 as shown in FIG. 1 or, as indicated above, it may be housed within a steering gear housing 17.

The remaining mechanical portions of the improved power steering system 10 are arranged in a manner that is typically found in a manual steering system. For instance, in FIG. 1 the rack and pinion unit 15 provides steering motion to front wheels 19a and 19b via links 21a and 21b, respectively.

Figure 2:
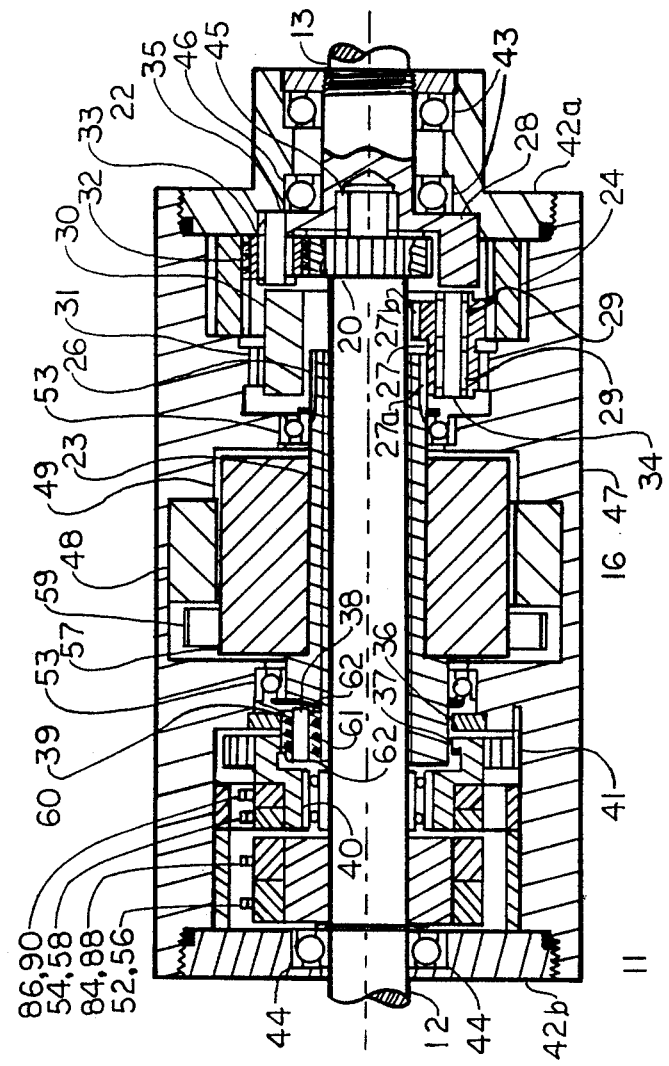
FIG. 2 is a cross-sectional view of a servo motor and gear assembly of a preferred embodiment of the present invention.

The mechanism contained within the power steering unit 11 is of generally concentric disposition and is mounted within a housing 47 as shown in FIG. 2. The servo motor 16 comprises a field 48, which is mounted directly within the housing 47; an armature 49, which is mounted on an armature shaft 23; a commutator 57; and brushes 59. The armature shaft 23 rotates within and is located with respect to the housing 47 by two ball bearings 53. The armature shaft 23 is formed in a tubular manner to accommodate axial passage therethrough of the upper steering shaft 12 which terminates at a sun gear 20 of a planetary gear train 22.

The servo motor 16 is coupled to a ring gear 24 of the planetary gear train 22 via an internal differential planetary gear train 25. An armature gear 26 is formed on the output end of the armature shaft 23. The armature gear 26 meshes with each of a multiplicity (typically three) of input gears 27a of the internal differential planetary gear train 25.

The input gears 27a are formed on one end, and output gears 27b are formed on the other end, of pinion gears 27. When the input gears 27a and the output gears 27b are formed on the pinion gears 27 they are all similarly indexed with respect to one another (i.e., one tooth of each input gear 27a is in axial alignment with a tooth of each output gear 27b). The pinion gears 27 are mounted on bearings 29 which rotate about shafts 34 and are retained within a planetary carrier 30. (The bearings 29 are typically drawn cup needle roller bearings such as number Y-2.4 available from The Torrington Company of Torrington, Conn.)

The input gears 27a also mesh with a fixed internal gear 31. Thus, rotational position of the planetary carrier 30 is determined by rotational position of the armature shaft 23 divided by a gear ratio between the armature gear 26 and the planetary carrier 30, Rpc, which can be calculated according to $$Rpc = (1 + Nig/Nag),$$

where Nig is the number of teeth on the internal gear 31 and Nag is the number of teeth on the armature gear 26.

The output gears 27b mesh with the ring gear 24 which is also a component portion of the planetary gear train 22. Thus, rotational position of the ring gear 24 is determined by rotational position of the planetary carrier 30 divided by a gear ratio between the planetary carrier 30 and the ring gear 24, Rrg, which can be calculated according to $$Rrg = 1/(1 - NigNpgb/NpgaNr),$$

where Npgb is the number of teeth on the output gear 27b, Npga is the number of teeth on the input gear 27a and Nr is the number of teeth on the ring gear 24.

The overall gear ratio between the armature shaft 23 and the ring gear 24 is RpcRrg. For instance, if Nig=60 teeth, Nag=28 teeth, Npgb=20 teeth, Npga=16 teeth and Nr=64 teeth, then the overall gear ratio is −18.29:1 (the − sign indicating that the armature shaft and the ring gear rotate in opposite directions).

A multiplicity (typically three) of planetary gears 32 simultaneously mesh with both the sun gear 20 and the ring gear 24. The planetary gears 32 are mounted on bearings 33 which rotate about shafts 35 and are retained within another planetary carrier 28. (The bearings 33 typically are similar to the bearings 29.) The planetary carrier 28 is coupled directly to the lower steering shaft 13. The rotational position of the planetary carrier 28 is determined by summing the rotational positions of the sun gear 20 and the ring gear 24 multiplied by the inverses of their respective gear ratios with respect to the planetary carrier 28.

The gear ratios between the sun gear 20 and the planetary carrier 28, Rs, and the ring gear 24 and the planetary carrier, Rr, can be calculated according to $Rs = (1 + Nr/Ns)$ and $Rr = (1 + Ns/Nr)$, respectively, where Ns is the number of teeth on the sun gear 20 and Nr is the number of teeth on the ring gear 24 (as already defined above). By simultaneously solving the above equations, Rr is found to be equal to Rs/(Rs−1). Thus, the sum of the inverse values is $1/Rs + (Rs−1)/Rs = 1$.

The torque relationships between the sun gear 20, the ring gear 24 and the steering gear 18 are governed by this last equation. Thus, the portion of the torque delivered to the planetary carrier 28 and the steering gear 18 via the steering wheel 14, upper steering shaft 12 and sun gear 20 is 1/Rs while the portion provided by the servo motor 16 via the internal differential planetary gear train 25 and ring gear 24 is (Rs−1)/Rs.

For instance, if the sun gear 20 has half as many teeth (i.e., 32 teeth) as the ring gear 24, the ratio between the sun gear 20 and the planetary carrier 28 is 3:1 while the ratio between the ring gear 24 and the planetary carrier 28 is 1.5:1. Thus, the torque delivered to the steering gear 18 via the steering wheel 14 is 0.333 times the torque delivered to the lower steering shaft 13 while the torque provided by the servo motor 16 via the internal differential gear train 25 is 0.667 times the torque delivered to the lower steering shaft 13. Further, these values are independent of all other factors. Thus, the steering effort provided by the operator of the vehicle is linearly related to that required by the steering gear 18 by the calculated proportionality factor (0.333 in the example used herein).

As shown in both FIGS. 1 and 2, the servo motor 16 is driven by the servo control unit 50 in response to first and second input signals from a first set of first and second shaft angle transducers 52 and 54, respectively. The first and second input signals are utilized to monitor rotational position of the upper steering shaft 12 and the armature 49, respectively. Any type of shaft angle transducer having sufficient resolution may be utilized for the shaft angle transducers 52 and 54. Shown in FIG. 2 are potentiometers 56 and 58 which are utilized therefor, respectively, in the improved power steering system 10.

The potentiometer 56 is directly coupled to the upper steering shaft 12. On the other hand, the potentiometer 58 is coupled to the armature 49 via an anti-backlash gear set 60 which has a relatively large reduction gear ratio. This is done primarily because the armature 49 rotates through a large number of turns in normal use. 82 turns are used in the example herein—which is impractical for the potentiometer 58 to accommodate directly. An anti-backlash gear set is used for this purpose because the potentiometer 58 is electronically disposed within a servo control loop which is utilized for controlling the angular position of the armature 49. Thus, it is desirable to faithfully monitor minute changes in the angular position of the armature 49.

The anti-backlash gear set 60 comprises a spring loaded internal differential planetary gear train. Comprised within the anti-backlash gear set 60 is a pinion gear 61 that simultaneously meshes with a fixed gear 36 and a driven gear 37. The fixed gear 36 and the driven gear 37 have identical pitch diameters but different numbers of teeth. Thus, the gear ratio between the armature shaft 23 and the driven gear 37 is determined by a similar equation to that for determining the gear ratio Rrg (above).

For instance, if the fixed gear 36 has 99 teeth and the driven gear 37 has 100 teeth, the resulting gear ratio between the armature shaft 23 and the driven gear 37 is 100:1. The pinion gear 61 is mounted on sleeve bearings 62 which rotate about a shaft 38 and are retained within a cavity 39 that is formed within the armature shaft 23. (The sleeve bearings 62 are typically self lubricating bearings such as number 02DU02 available from Garlock Bearings Inc. of Thorofare, N.J.)

The driven gear 37 is directly coupled to the rotating portions of the potentiometer 58 and another potentiometer 90 which is ganged therewith. The rotating grouping comprising the driven gear 37 and the rotating portions of the potentiometers 58 and 90 is mounted upon a double row bearing 40 for rotation about the upper steering shaft 12. (The double row bearing 40 is typically a double row torque tube type bearing such as number B5538WZZ FS464 available from Fafnir Rearing Division of Textron Inc. of New Britain, Conn.) The driven gear 37 is spring loaded in a tangential direction with respect to the housing 47 of the power steering unit 11 by a clock spring 41.

The lower steering shaft 13 is located within an end bell 42a by two ball bearings 43. The upper steering shaft 12 is located within an end bell 42b by a ball bearing 44. It is also located radially and axially with respect to the lower steering shaft 13 by bearings 45 and 46. (The bearing 45 is typically another drawn cup needle roller bearing and the bearing 46 is typically a thrust needle roller bearing such as an NTA 815, which is also available from the The Torrington Company.)

The value of the second input signal from the potentiometer 58 is continually compared with the value of a control signal. This control signal is a selected function of the first input signal from the potentiometer 56. It is derived from the first input signal by a first signal regulator 55, which is located within the servo control unit 50.

If the compared values of the control signal and the second input signal are not equal, other circuitry located within the servo control unit 50 derives an error signal therefrom and transmits a suitably amplified corrective power signal to the servo motor 16. The corrective power signal causes the servo motor 16 to rotate the anti-backlash gear set 60. This rotational motion changes the setting of the potentiometer 58 and the value of the second input signal until the second input signal matches the value of the control signal. In so doing, the servo motor 16 also drives the internal differential planetary gear train 25, ring gear 24 and planetary carrier 28 to a rotational position that appropriately matches the rotational position of the steering wheel 14.

This process is a dynamic one that continually causes the servo motor 16 to appropriately track the position of the steering wheel 14, thus providing desired steering motions. This occurs because rotational motion of the steering wheel 14 rotates the upper steering shaft 12 and the potentiometer 56, and therefore modifies the value of the first input signal. As the value of the first input signal changes, the control signal changes and the servo control unit 50 continually derives an error signal between the control signal and the second input signal.

The resulting corrective power signal produces the desired steering motions as described above.

As will be fully explained hereinbelow, the selected function of the first input signal that determines the control signal can be continually modified with respect to a regulating signal. Thus, the effective steering ratio of the improved power steering system 10 can be electronically varied with respect to the regulating signal. If the regulating signal is representative of the speed of a vehicle, then the effective steering ratio can be varied as a function of vehicular speed.

Figure 3:
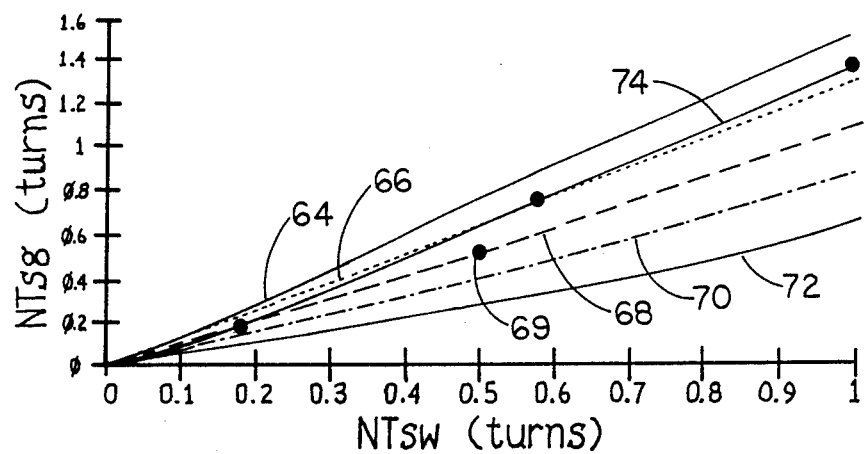
FIG. 3 is a graph which illustrates an operational characteristic of the improved power steering system whereby its steering ratio varies as a function of vehicular speed.
Figure 4A:
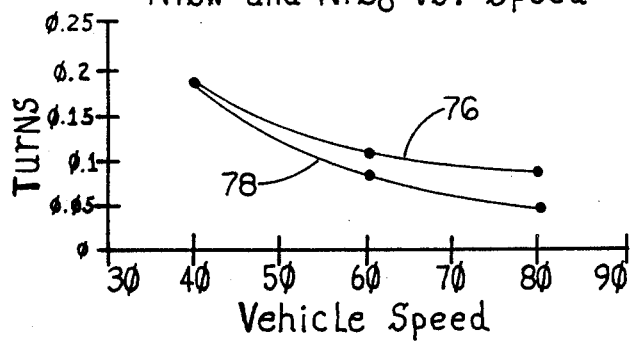
FIG. 4A is a graph which illustrates a divergence in rotations of a vehicle's steering wheel and steering gear with respect to vehicular speeds above 40 miles per hour.
Figure 4B:
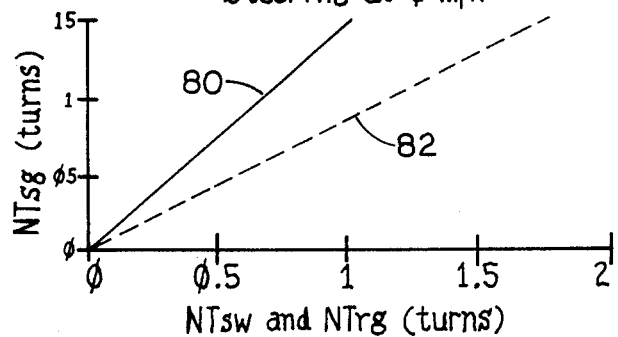
FIG. 4B is a graph which illustrates a divergence in rotations of a vehicle's steering wheel and the improved power steering system's ring gear at 0 miles per hour.

For instance, in a case illustrated by graphs shown in FIGS. 3, 4A and 4B wherein the pinion 30 of the steering gear 18 rotates 3.0 turns lock-to-lock, the effective steering ratio can be varied smoothly from a value of approximately 2.0 turns-to-lock at very low vehicular speeds to a value that is equivalent to approximately 5.6 turns lock-to-lock at high vehicular speeds (such as 80 miles per hour and above herein). This capability results in enhanced maneuvering convenience when parking—coupled with increased stability at high speed. (And, coincides exactly with perceived advantages of four wheel steering systems at a fraction of their cost.)

Shown in FIG. 3 is a set of curves, 64, 66, 68, 70 and 72, which show the relationship between steering wheel and steering gear rotation for vehicular speeds of 0, 20, 40, 60 and 80 miles per hour, respectively. These curves illustrate steering wheel rotation in either direction, from straight ahead (zero turns) to a full rotation value (in either direction) of one turn of the steering wheel 14. For instance, at very low speeds, the steering gear 18 rotates approximately 1.5 turns when the steering wheel 14 rotates one turn.

Although the curves 66, 68, 70 and 72 show the relationship between steering wheel rotation and steering gear rotation for values of steering wheel rotation up to one turn, the higher values of steering wheel rotation can not be utilized at higher vehicular speeds. This is because the resulting lateral acceleration values would exceed vehicular adhesion limits. For instance, attempting operation below curve 74 would require impractically high lateral acceleration values.

During operation at 40 miles per hour, rotational values attained by the steering wheel 14 and the steering gear 18 are substantially equal, as is shown by the curve 68. For vehicular speeds below 40 miles per hour, maneuvering is enhanced because fewer turns of the steering wheel 14 are required—as illustrated by the curves 64 and 66. On the other hand, for vehicular speeds above 40 miles per hour, stability is enhanced because more turns of the steering wheel 14 are required—as illustrated by the curves 70 and 72. This is particularly illustrated by the divergence of curves 76 and 78 in FIG. 4A. The curves 76 and 78 show the relationship between vehicular speed, and rotational values of the steering wheel and steering gear, respectively, for the lateral acceleration value indicated by the curve 74 of FIG. 3.

The reduced rotations required of the steering wheel 14 are made up by increased rotations of the ring gear 24 via the additive action of the planetary gear train 22. This is illustrated by the divergence of curves 80 and 82 in FIG. 4B. The curves 80 and 82 show relationships between rotations of the steering wheel 14 and the ring gear 24, respectively, and rotations of the steering gear 18 at 0 miles per hour.

Rotations of the ring gear 24 can be determined according to $$NTrg = (Rs NTsg - NTsw)/(Rs - 1),$$

where $NTrg$ is the number of turns of the ring gear 24, $NTsg$ is the number of turns of the steering gear, $NTsw$ is the number of turns of the steering wheel 14 and $Rs$ is the gear ratio between the sun gear 20 and the planetary carrier 28 as defined above. (The following maximum compatible values of these variables will be used for numerical examples that follow: $NTsg = 1.5$, $NTsw = 1.0$, $Rs = 3$ and $NTrg = 1.75$.)

Continuous verification of the functioning of the power steering system 10 is provided in response to first and second measurement signals from a second (or redundant) set of first and second shaft angle transducers 84 and 86, respectively. While any type of shaft angle transducer having sufficient resolution may be utilized for the shaft angle transducers 84 and 86, it is convenient to use potentiometers 88 and 90, respectively, which are similarly valued and ganged together with the potentiometers 56 and 58, respectively, for this purpose.

In operation, the value of the second measurement signal is continually compared with the value of a reference signal, which is processed by a second signal regulator 87 from the first measurement signal. The reference signal is determined by a similar selected function of the first measurement signal (as that used above with respect to determining the control signal).

If the values of the reference signal and second measurement signal are excessively in variance, then a railsafe safety system is activated. In so doing, the servo control unit 50 deactivates an electrically actuated contactor 92 (such as those available from the prestolite Motor and Ignition Company of Toledo, Ohio) which is normally held in an activated condition during operation of the improved power steering system 10. In addition, when the fail-safe safety system is activated by the servo control unit 50, an alarm 51 is also activated to warn the operator of the vehicle that he or she is then steering manually.

The contactor 92 is wired with a normally open contact (not shown) in series with power conductors 94 and 96 and thus with the windings of the armature 49. It is also wired with a normally closed contact (not shown) connecting the power conductor 96 to a return power conductor 97, which faults the windings of the armature 49 when closed. If the contactor 92 is deactivated, the circuit that normally conducts the power signal from the servo control unit 50 to the windings of the armature 49 is disconnected and the windings of the armature 49 are faulted. Thus, the armature 49 rapidly decelerates to zero rotational velocity.

Because differential planetary gear trains such as the internal differential planetary gear train 25 are self-locking when an attempt is made to operate them in reverse, rotation of the armature 49 is precluded under the above condition. Since the ring gear 24 is thus held stationary, manual steering can be accomplished with no apparent change in steering effort at an increased mechanical steering ratio.

When compared with the steering ratio nominally provided by the steering gear 18, the factor by which the mechanical steering ratio increases is equal in value to the gear ratio, Rs, between the sun gear 20 and the planetary carrier 28. If Rs=3:1 and the lower steering shaft 13 rotates 3.0 turns lock-to-lock, then manual steering will be accomplished wherein the steering wheel 14 rotates 9.0 turns lock-to-lock. While such a value is high, it is not excessive when compared with the best handling manual steering cars of earlier time periods. (For instance, the Hudson automobile was well respected in this regard and yet its steering wheel rotated approximately 6 turns lock-to-lock.)

Of much greater importance, there will be no change in steering effort if a failure should occur. This safety factor would be quite important in the aforementioned event that a person having limited physical strength were to be driving a vehicle equipped with the improved power steering system 10 and such a failure occurred in a tight turn on a mountain road.

Figure 5:
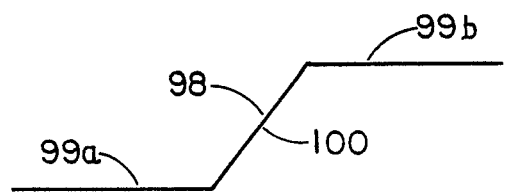
FIG. 5 is a graph which illustrates a resistance characteristic of a first potentiometer which is utilized to indicate rotational positions of the vehicle's steering wheel.

Each of the ganged potentiometers 56 and 88 are multiturn potentiometers having a nonlinear resistance characteristic (with respect to rotation) as shown by a resistance characteristic curve 98 in FIG. 5. Each end portion 99a and 99b of the curve 98 is non-varying because each end portion of the potentiometers 56 and 88 is substantially conductive. The center portion 100 of the curve 98 is linearly varying because the center portions of the potentiometers 56 and 88 have linear resistance characteristics. The curve 98 is continuous because the end portions of potentiometers 56 and 88 are electrically connected to their respective ends of their center portions.

Normal operation of the potentiometers 56 and 88 occurs in their center portions only. Should the fail-safe safety system be activated and manual steering commence, overrun operation of the potentiometers 56 and 88 into their end portions is probable. However, no discontinuity in control or reference signal values will ensue thereby. A return to syncronized mechanical positioning of the steering wheel 14 is assured when the problem is cleared and the improved power steering system 10 is returned to service.

If one of the vehicle's steerable wheels is jammed (i.e., such as against a curb), it is possible for the vehicle's operator to continue to turn the steering wheel 14 in the direction of the jam. Turning the steering wheel 14 in the direction of the jam could demand excessive current from the servo control unit 50. This will activate a current limiting mode of operation of the servo control unit 50. In the current limiting mode of operation both the control signal and the reference signal are equally suppressed (as will be explained below). This results in the error signal yielding a predetermined maximum value of servo motor current. The fail-safe safety system is not activated in this case because the second measurement signal continues to match the modified reference signal.

When the current limiting mode of operation of the servo control unit 50 is activated, the alarm 51 also activated. However, since the fail-safe safety system is not activated, the vehicle's operator can stop the alarm 51 by rotating the steering wheel away from the jam.

However, should the vehicle's operator ignore the alarm 51 and continue turning the steering wheel 14 in the direction of the jam, an attendent reversal of the value of the control signal will cause the servo motor 16 to reverse direction and back up. This allows the planetary carrier 28 and the steering gear 18 to remain stationary against the jam. In this case, maximum current will continue to flow in the motor. Such a condition is similar to continually operating the starter motor of an engine that will not start. This is not satisfactory because it will result in overheating the servo motor 16.

If the vehicle's operator continues to ignore the alarm 51 and turns the steering wheel 14 against a jam indefinitely, one of two things will occur: The continuing operation at maximum current will result in blowing a fuse 101, which will open the power circuit and deactivate the current limiting mode of operation of the servo control unit 50. Or, in a more extreme case, the servo motor 16 will back up to such a position that it is no longer operating within its normal range of operational positions.

Figure 6A:
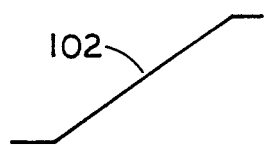
FIGS. 6A and 6B are graphs which illustrate resistance characteristics of second and third potentiometers which are utilized to indicate rotational position of a servo motor of the improved power steering system.
Figure 6B:
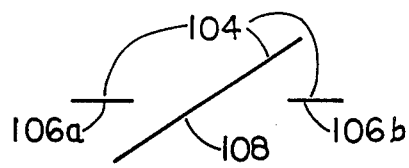

As illustrated by FIGS. 6A and 68, potentiometers having a nonlinear characteristic are also utilized for the potentiometers 58 and 90. As shown by a curve 102 in FIG. 6A, the end portions of the potentiometer 58 are conductive and electrically connected to the ends of a linear center portion in a manner similar to that shown in FIG. 5 for the potentiometers 56 and 88. However, as shown by a discontinuous curve 104 in FIG. 6B, the end portions of the potentiometer 90 are electrically isolated from the ends of a linear center portion. This is illustrated by nonvarying end portions 106a and 106b of the discontinuous curve 104 being disconnected from a linearly varying center portion 108 of the discontinuous curve 104. Thus, for the case in which the servo motor 16 no longer operates in its normal range, the potentiometer 58 no longer operates in its linear range and the potentiometer 90 operates discontinuously.

Should either a blown fuse or the discontinuous operation described above occur, a mismatch between the second measurement signal and the reference signal will result. Thus, the fail-safe safety system will be activated and manual steering engaged.

Figure 7:
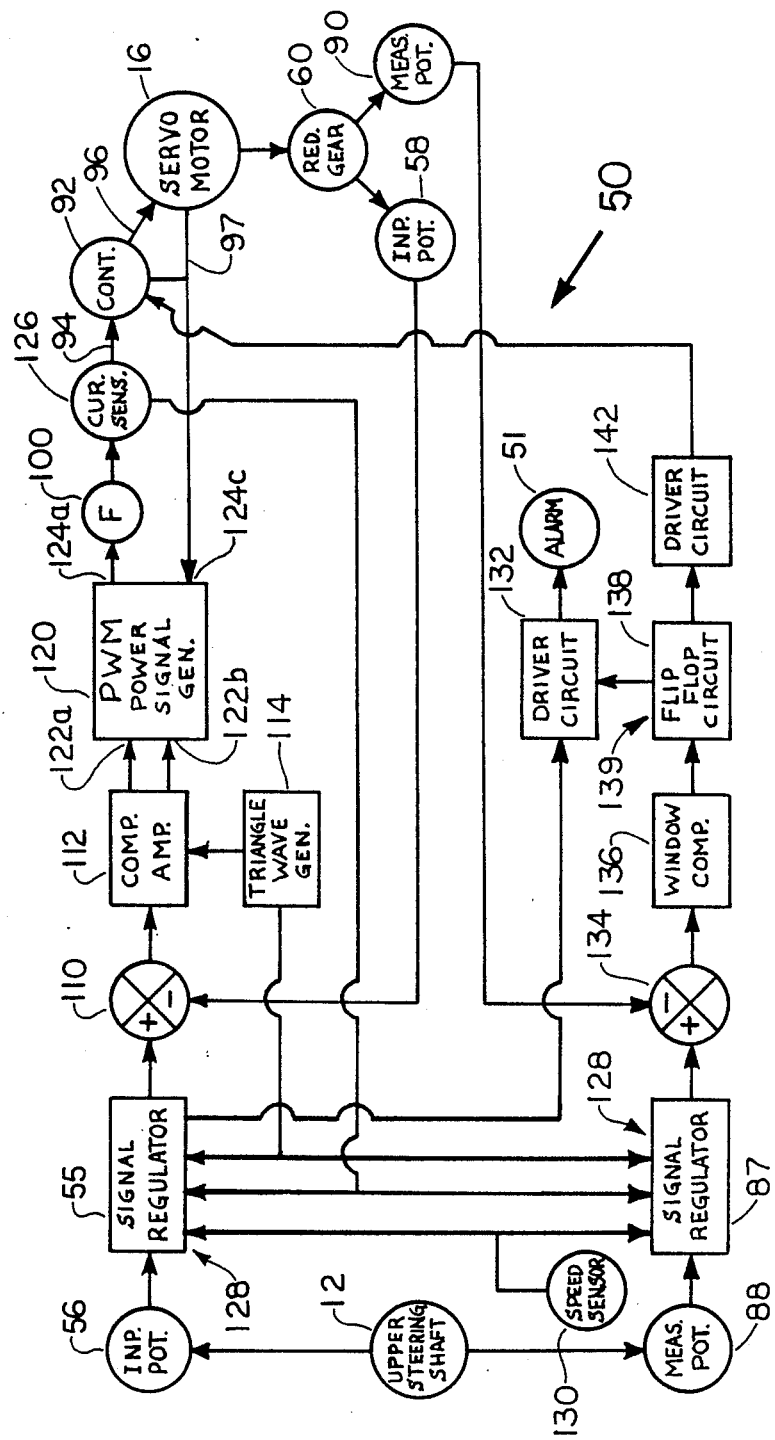
FIG. 7 is a block diagram illustrating the overall circuit configuration of a servo control unit for the improved power steering system.

Shown in FIG. 7 is a block diagram illustrating the functioning of the servo control unit 50. Mechanical positioning of the potentiometer 56 is obtained via motion of the upper steering shaft 12. The output signal of the potentiometer 56 is processed by the signal regulator 55 and input to a positive input terminal of a differential summing point 110. Mechanical positioning of the potentiometer 58 is obtained via the servo motor 16 and the anti-backlash gear set 60. The output signal of the potentiometer 58 is input to a negative input terminal of the differential summing point 110.

The output signal of the summing point 110 is input to a first input terminal of a compensating amplifier 112 wherein it is amplified in a compensating manner and bifurcated into buffered and inverted output signals. The buffered and inverted output signals are each compared with a triangle wave signal which is generated by a triangle wave generator 114. The triangle wave signal has a moderate frequency such as 2.2 kHz.

Figure 8A:
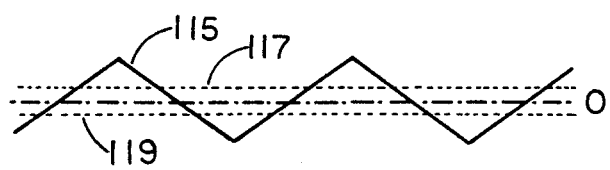
FIGS. 8A, 8B and 8C are graphs which illustrate input signal waveforms which are applied to first and second comparators, and first and second PWM signals which are generated thereby.
Figure 8B:
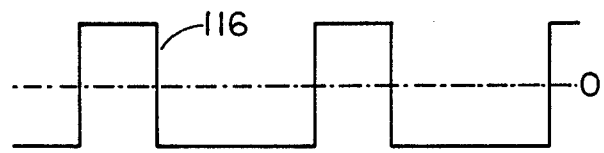
Figure 8C:
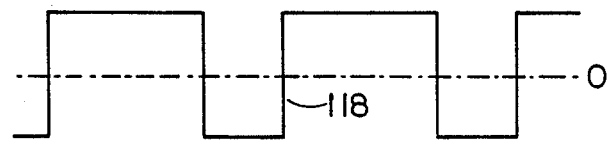

These signal comparisons are illustrated in FIG. 8A. The triangle wave is depicted by a curve 115 while the buffered and inverted output signals are depicted by curves 117 and 119, respectively. As a function of each intersection between the triangle waveform and the buffered and inverted output signals, first and second pulse width modulated signals (hereinafter "PWM signals") are formed, respectively. The first and second PWM signals are shown in FIGS. 8B and 8C, respectively. The first PWM signal is represented by curve 116 in FIG. 8B and the second PWM signal is represented by curve 118 in FIG. 8C.

The first and second PWM signals are modulated between voltages substantially equal in value to the voltages present on the positive terminal (hereinafter "V+") and negative terminal (hereinafter "V−") of the vehicle's battery 8 (shown in FIG. 1). The first and second PWM signals are modulated in a complementary manner wherein their asymmetry is proportional to the inverse of the values of the buffered and inverted signals, respectively.

Figure 9A:
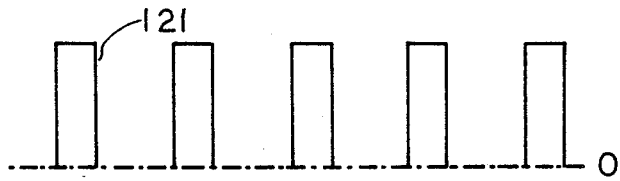
FIGS. 9A and 9B are graphs which illustrate PWM power signals which are generated by a PWM power signal generator of the improved power steering system.

The first and second PWM signals are then input to first and second input terminals 122a and 122b, respectively, of a PWM power signal generator 120 wherein they are utilized to cause first and second output terminals 124a and 124b, respectively, to be switched to V− and V+, respectively. Thus, whenever either of the first or second PWM signals is positive, its respective PWM power signal generator output terminal is negative and vice versa. Thus, the output voltage (hereinafter "PWM power signal") of the PWM power signal generator 120 (as measured between the first and second output terminals 124a and 124b, respectively) is equal to the inverse value of the difference between the curves 118 and 116, respectively as shown by curve 121 in FIG. 9A. The PWM power signal is in phase with the buffered output signal and has approximately 3 times the signal level of the buffered output signal (i.e., a "gain" of 3).

Figure 9B:
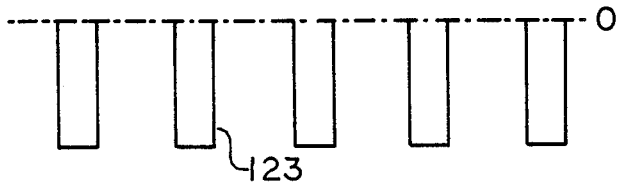

The PWM power signal is a single polarity pulse width modulated signal whose modulation frequency is twice that of the first and second PWM signals. The PWM power signal smoothly reduces its modulation value, and then inverts through zero signal value and increases its modulation value, as the buffered and inverted signals are reduced in value and then inverted in polarity. Such an inverted PWM power signal is illustrated by curve 123 in FIG. 9B.

Reverse current diodes, which are inherently in parallel with forward current power devices utilized in the PWM power signal generator 120, enable full four quadrant operation of the PWM power signal generator 120. Thus, any combination of voltage and current polarities demanded by the servo motor 16 can be accommodated by the PWM power signal generator 120.

Current delivered from the first output terminal 124a is input to a first terminal 125 of the servo motor 16 via the fuse 100, a current sensor 126, the power conductor 94, the contactor 92 and the power conductor 96. The current is returned from a second terminal 127 of the servo motor 16 to the second output terminal 124b via the return power conductor 97. All resulting motions of the servo motor 16 are monitored by the potentiometer 58 (as driven by the servo motor 16 via the anti-backlash gear set 60) whose output signal is input to a negative input terminal of the summing point 110 to close the fundamental control servo loop.

In the signal regulator 55, a speed voltage signal, which is derived from a vehicular speed sensor 130, is compared with the triangle wave signal generated by the triangle wave generator 114. This signal comparison is used to form positive and negative PWM signals whose modulation is linearly related to the value of the speed voltage signal. As will be described below, the positive and negative PWM signals are utilized by the signal regulator 55 to selectively suppress the output signal of the potentiometer 56. This serves to increase the effective steering ratio as a function of vehicular speed.

The current sensor 126 comprises a Hall effect device wherein a differential voltage is generated as the product of a reference current conducted therethrough multiplied by magnetic flux surrounding a conductor carrying current to be measured. (Current measuring devices such as the current sensor 126 are available commercially from F. W. Bell Inc. of Orlando, Fla. An example of a current measuring device comprising apparatus that is suitable for the current sensor 126 is their model PI-100 Current Sensor.)

The current measurement signal from the current sensor 126 is input to the signal regulator 55 wherein a window exclusion amplifier 128 (described below) amplifies excessive current measurement signal values. Output signals from the window exclusion amplifier 128 are utilized to suppress the output signal of the signal regulator 55 in order to provide current limiting of the PWM power signal. The output signals from the window exclusion amplifier 128 are also input to a driver circuit 132 which causes the alarm 51 to be activated.

The potentiometers 88 and 90 are driven by the upper steering shaft 12 and anti-backlash gear set 60, respectively, and output substantially the same signal values as the potentiometers 56 and 58, respectively. The signal regulator 87 processes signals from the potentiometer 88 in substantially the same manner as the signal regulator 55 processes signals from the potentiometer 56. The output signals from the signal regulator 87 and the potentiometer 90 are input to positive and negative input terminals, respectively, of a summing point 134.

The summing point 134 generates the reference signal noted above as a linear function of the difference between the output signals from the signal regulator 87 and the potentiometer 90. The reference signal is input to a window comparitor circuit 136 which outputs a deactivating signal to a flip flop circuit 138 whenever the value of the reference signal is excessive.

A voltage divider 139 sets the flip flop circuit 138 in its activated state whenever the ignition switch 9 is turned on. The flip flop circuit 138 then outputs an activating signal to a driver circuit 142. The driver circuit 142 activates the contactor 92. This connects the power conductors 94 and 96 and allows the servo motor 16 to be driven by the PWM power signal generator 120.

If the window comparitor circuit 136 outputs a deactivating signal to the flip flop circuit 138, the flip flop circuit 138 changes to its deactivated state and removes the activating signal to the driver circuit 142—which deactivates the contactor 92. This disconnects the power conductors 94 and 96, and connects the power conductor 96 to the return power conductor 97—thus faulting the armature 49 and thereby causing it to rapidly decelerate to zero rotational speed. Whenever it is in the deactivated state, the flip flop circuit 138 outputs a second activating signal to the driver circuit 132 which activates the alarm 51.

These actions comprise activation of the fail-safe safety system. It is termed fail-safe because the flip flop circuit 138, driver circuit 142 and contactor 92 must all be in their activated states in order to enable the servo motor 16 to be driven by the PWM power signal generator.

(The following paragraphs describe preferred embodiments of the various circuits mentioned above in detail. These detailed descriptions are made herein because many of the practitioners in the field of power steering systems are mechanical engineers not necessarily skilled in the art of analog electronics.)

Common building blocks for the various control circuits are first and second types of operational amplifier integrated circuits which will be referred to as amplifiers and comparitors, respectively, herein. Both of these operational amplifier integrated circuits are characterized by having differential first (negative) and second (positive) input terminals and a single output terminal. The input terminals present a very high impedance to input signals. The signal generated at the output terminal assumes a signal voltage value equal in sign to the algebraic sum of the input voltage signals (hereinafter known as "differential input signal") times the respective polarities of the input terminals. And, it assumes a signal voltage equal in magnitude to the product of the differential input signal and the gain of the particular device.

Figure 10:
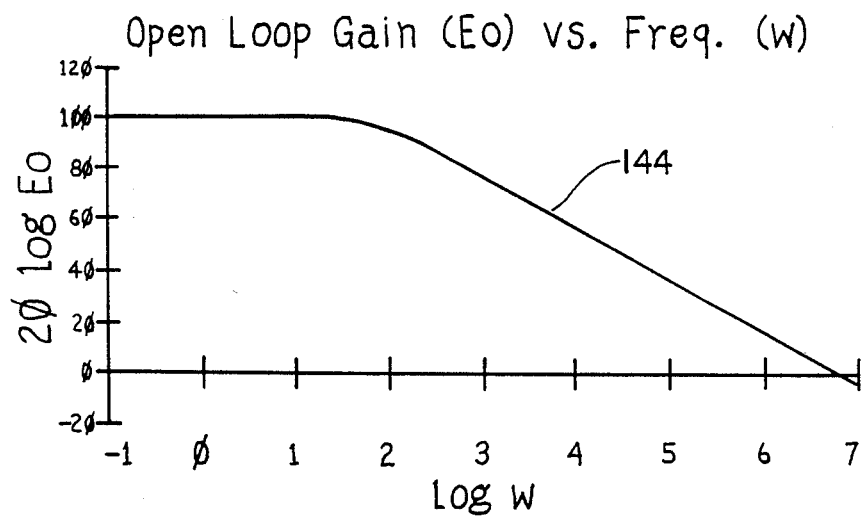
FIG. 10 is a graph called a Bode plot which illustrates an open loop gain characteristic commonly associated with an internally compensated operational amplifier integrated circuit.

Amplifiers are characterized by comprising active devices, resistors and at least one capacitor in their circuitry. The combination of the resistors and capacitor results in amplifiers having a single time constant in their open-loop response. Thus, their open-loop response with respect to frequency is nominally described by curve 144 of FIG. 10. FIG. 10 is a Bode plot of the open-loop gain of a typical amplifier wherein the curve 144 illustrates an amplifier that has a low frequency gain of 100,000, a single pole roll-off at 90 degrees phase shift and a unity gain cross-over at 6.28 mega rad./sec. or 1 MHz. This single pole roll-off at 90 degrees phase shift characteristic enables an amplifier to have a stable output signal. Many suitable amplifiers are commercially available and some are available as quads wherein four amplifiers are packaged on a single integrated circuit chip. (An example of such a quad amplifier chip is an LM 324 which is available from National Semiconductor Corporation of Santa Clara, Calif.)

On the other hand, a comparitor has no internal capacitor, and its open-loop output signal has no roll-off and is not stable. Depending upon a change in polarity of the differential sum of values of differential signals imposed upon the positive and negative terminals thereupon, its response is virtually instantaneous in jumping from output signal values of nominally one supply voltage rail to the other supply voltage rail (i.e., transition times of less than one micro-second from V− to V+ or from V+ to V−). Many suitable comparitors are also commercially available and some are also available as quads. (An example of such a quad comparitor chip is an LM 339 which is also available from the National Semiconductor Corporation.)

Some operational amplifier integrated circuits require either pull-up or pull-down resistors connecting their output terminals to a more positive voltage source or a more negative voltage source, respectively (i.e., V+ or V− herein), in order to achieve a full range of output voltages. These pull-up and pull-down resistors should be of a lower resistance value than the sum of all load impedances which are also connected to the output terminals. (The individual amplifiers and comparitors of the LM 324 and LM 339 quad devices mentioned above require pull-down and pull-up resistors, respectively.)

However, in order to achieve minimum complexity in the circuit diagrams that follow, such pull-up and pull-down resistors will be omitted. Also, all of the active devices illustrated hereinbelow are understood to derive their power from V+ and V− although those connections are omitted as well. To aid in visual comprehension of the circuits shown herein, each operational amplifier integrated circuit that is utilized in the figures that follow is shown marked with either an A (depicting an amplifier) or a C (depicting a comparitor).

Figure 11:
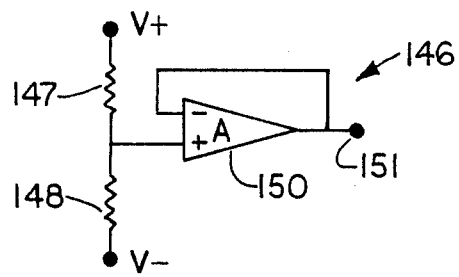
FIG. 11 is a circuit diagram illustrating a voltage follower circuit that is utilized to generate a signal ground voltage for the improved power steering system.

Shown in FIG. 11 is a simple voltage follower circuit 146 that is utilized to generate a signal ground voltage signal (hereinafter "ground potential") half way between V+ and V− on its output terminal 151. The output terminal 151 is also the output terminal of its only active device, amplifier 150. Resistors 147 and 148 are equal valued. (Hereinafter passive devices will be referred to by a letter such as R for resistors and C for capacitors, and their designating number—i.e., R147 and R148 for resistors 147 and 148, respectively. Their value will be similarly indicated—i.e., R147=R148=100 kohms.) Thus, the voltage at junction 149 is half way between V+ and V−. Since the output terminal of the amplifier 150 is directly connected to its negative input terminal and the entire gain of the amplifier 150 tries to reduce the differential input signal values to zero, the signal value at the output terminal 151 is substantially equal to the signal value at the junction 149, namely ground potential.

Figure 12:
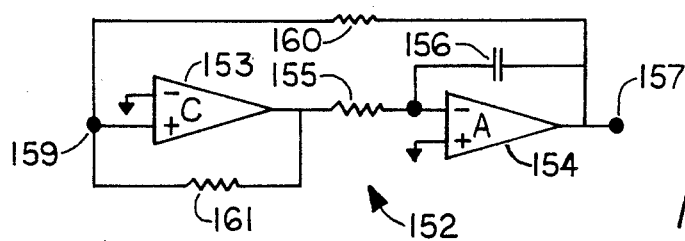
FIG. 12 is a circuit diagram illustrating a hysterysis oscillator circuit that is utilized to generate a triangle wave signal for the improved power steering system.

Shown in FIG. 12 is a hysteresis oscillator circuit 152 that is used for the triangle wave generator 114. Active devices in the hysteresis oscillator 152 include a comparitor 153 and an amplifier 154. Whenever the comparitor 153 is in its positive output state, constant positive load current flows through R155 to junction 158 and through C156 to junction 157, which is also the output terminal for the hysteresis oscillator circuit 152.

The voltage of the signal on junction 157 is decreased in a linear manner by the amplifier 154, thus keeping the junction 158 at ground potential. This continues until the voltage of the signal on junction 159 decreases to ground potential, as determined by a voltage divider formed by R160 and R161, whereupon the comparitor 153 changes to a negative state and the voltage of the signal on the junction 157 is increased in a linear manner. Each succeeding change of state reverses the slope (with respect to time) of the signal on junction 159 wherefrom a resulting triangle wave is output. The oscillation frequency of the triangle wave is determined according to $$Ftw = R161/4R155R160C156,$$

and has a peak-to-peak voltage of $(V+ - V-)R160/R161$. In these formulas, Ftw is the frequency of the triangle wave, R155, R160, R161 and C156 stand for the value of resistance (in ohms) or capacitance (in farads) of each particular device, respectively, and R161 must be greater in value than R160. Component values of R155=33 kohms, R160=100 kohms, R161=68 kohms and C156=0.005 mf yield an oscillation frequency of about 2.2 kHz with a peak-to-peak voltage of about 8 volts (assuming a 12 volt battery power source).

The mechanical and electrical characteristics of the servo motor 16 are fundamental in determining the nature of the summing point 110 and compensating amplifier 112. The servo motor 16 achieves rotational positioning according to $$\theta m = KmEi/jw(jwTm+1)(jwTe+1),$$

where $\theta m$ is the rotational position of the servo motor 16 and has the dimension radians; Km is a motor constant equal in value to no-load speed of the servo motor 16 divided by the voltage applied to the servo motor 16 and has the dimension rad./volt sec.; Ei is the applied voltage which has the dimension volts; j is the dimensionless imaginary constant; w is the rotational velocity of the output shaft which has the dimension rad./sec.; Tm is a mechanical time constant of the servo motor 16 which is equal in value to the moment of inertia of the effective value of rotating mass of the armature 49 multiplied by no-load motor speed (at a selected voltage) and divided by motor stall torque (at the same selected voltage), and has the dimension seconds; and Te is an electrical time constant of the servo motor 16 which is equal in value to inductance of the armature 49 divided by resistance of the armature 49 and has the dimension seconds.

Because the servo motor 16 must have a hollow shaft, it is purpose built. However, for purposes of illustration, a servo motor model number MH-3505-101A available from EG&G Torque Systems of Watertown, Mass. has specifications that are sufficient for use as the servo motor 16 and its use for the servo motor 16 will be assumed in the remaining examples. This motor has the following values:

Km=36 rad./volt sec.

Tm=0.01 sec.

Te=0.0015 sec. (Km is equal to 1.25 times the actual motor value of approximately 29 rad./volt sec. This higher value for Km is used in order to account for additional rotating mass inertia values of the interconnected apparatus which influence the response of the servo motor 16.)

The electrical time constant of the servo motor 16 (0.0015 sec.) influences the magnitude of ripple current present in the armature of the servo motor 16. (Since 1/w=0.000036 seconds for the 4.4 kHz PWM power signal, maximum values of ripple current in the armature which will occur at 50 percent modulation will be very small.)

A reduction gear ratio of 100:1 reduces the rotational position motions of the potentiometer 58 and the armature 49 rotates plus or minus 41 turns from zero position at full travel in either direction (or, 82 total turns). As will be shown below, full travel in either direction results in a signal therefrom of plus or minus 4.167 volts. Thus, the equation governing the output signal from the potentiometer 58 is $$Eo=0.582Ei/jw(jw0.01+1)(jw0.0015+1).$$

where Eo is the output signal of the potentiometer 58 and the 0.582 constant is determined from the relation (36 rad./volt sec.)(4.167 volts)/100(0.82pi rad.)=0.582 1/sec. Since Ei and w have the dimensions volts and rad./sec., respectively, Eo has the dimension volts/rad.

Figure 13A:
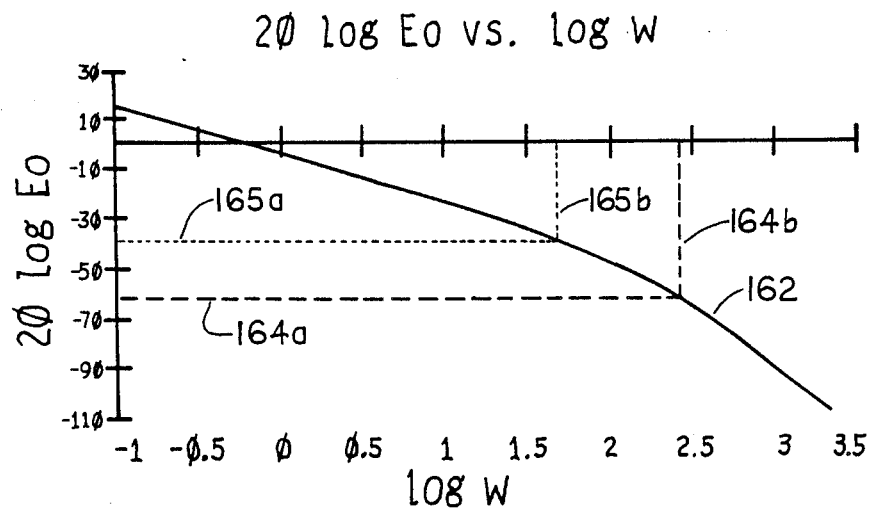
FIGS. 13A and 13B are Bode plots of the amplitude and phase, respectively, of signal levels indicating rotational position of the servo motor.
Figure 13B:
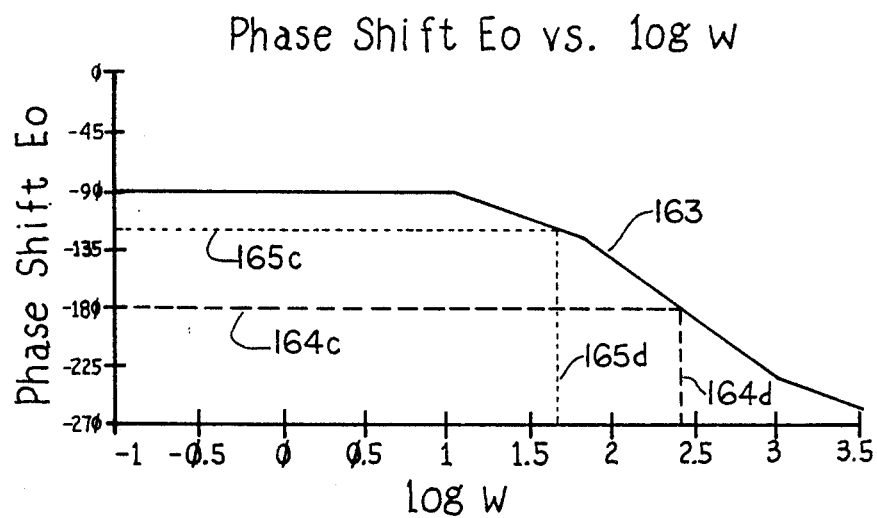

Shown in FIG. 13A and 13B are curves 162 and 163, resPectively, which depict Bode plots of 20 times the log (hereinafter "db") of Eo and phase shift of Eo vs. log w, respectively. Dashed lines 164a, 164b, 164c and 164d illustrate the value of log w (2.41) for which the phase shift is −180 degrees and the amplitude is −62.4 db. If a position control servo loop were to be implemented wherein an additional gain of 1,313 (the antilog of 62.4 db) was used to close the loop, that position control servo loop would oscillate at log w=2.41 or 41 Hz. This is because the resulting amplitude at 41 Hz would be 0 db or 1.0 (known as unity gain cross-over) and the phase shift would still be −180 degrees. These values comprise the conditions required for self induced oscillation. Thus, a smaller amount of phase shift and concomitant smaller amounts of additional gain would seem to be appropriate.

On the other hand, a closed loop servo system having a phase shift of −90 degrees at unity gain crossover is critically damped. A maximum additional gain of 25.3 db, which corresponds to observed values of 90 degrees phase shift and −25.3 db amplitude at log w=1, would satisfiy this condition.

However, faster system response can be obtained by utilizing an intermediate gain together with slightly reduced phase margin (where phase margin is defined as the absolute value of −180 degrees minus the phase shift actually obtained at unity gain cross-over) with less than critical damping. Dotted lines 165a, 165b, 165c and 165d illustrate the value of log w (1.67) for which the phase shift is 120 degrees and the amplitude is −39.2 db. If a position control servo loop were to be implemented wherein an additional gain of 90.8 (the antilog of 39.2 db) was used to close the loop, the resulting phase margin would be 60 degrees and the loop would be stable.

Figure 14:
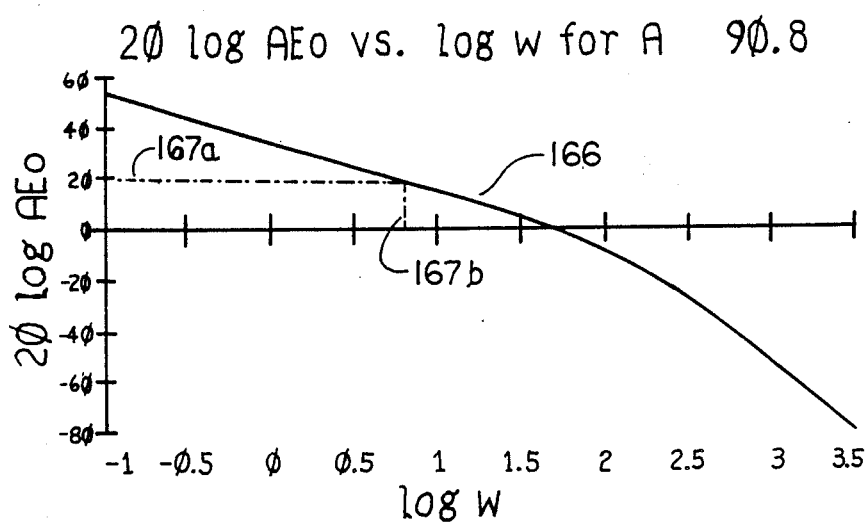
FIG. 14 is a Bode plot of the amplitude of signal levels shown in FIG. 13A multiplied by an amplifier having a gain of 90.8.

Shown in FIG. 14 is curve 166 which depicts a Bode plot of AEo (in db) vs. log w for A=90.8. Dash-dotted lines 167a and 167b show a loop gain of 18.3 db, or 8.2, at log w=0.8, or 1 Hz. Thus, (as will be justified below) a closed loop servo system comprising a gain of 90.8 would respond to a rotatonal velocity input (at 1 Hz) to the potentiometer 56 with an error of 1−8.2/(1+8.2)=0.109 times that rotational velocity input. It would also have a significant rotational position error against any torsional load. It would, in fact, feel "spongy" and be unsatisfactory.

Figure 15:
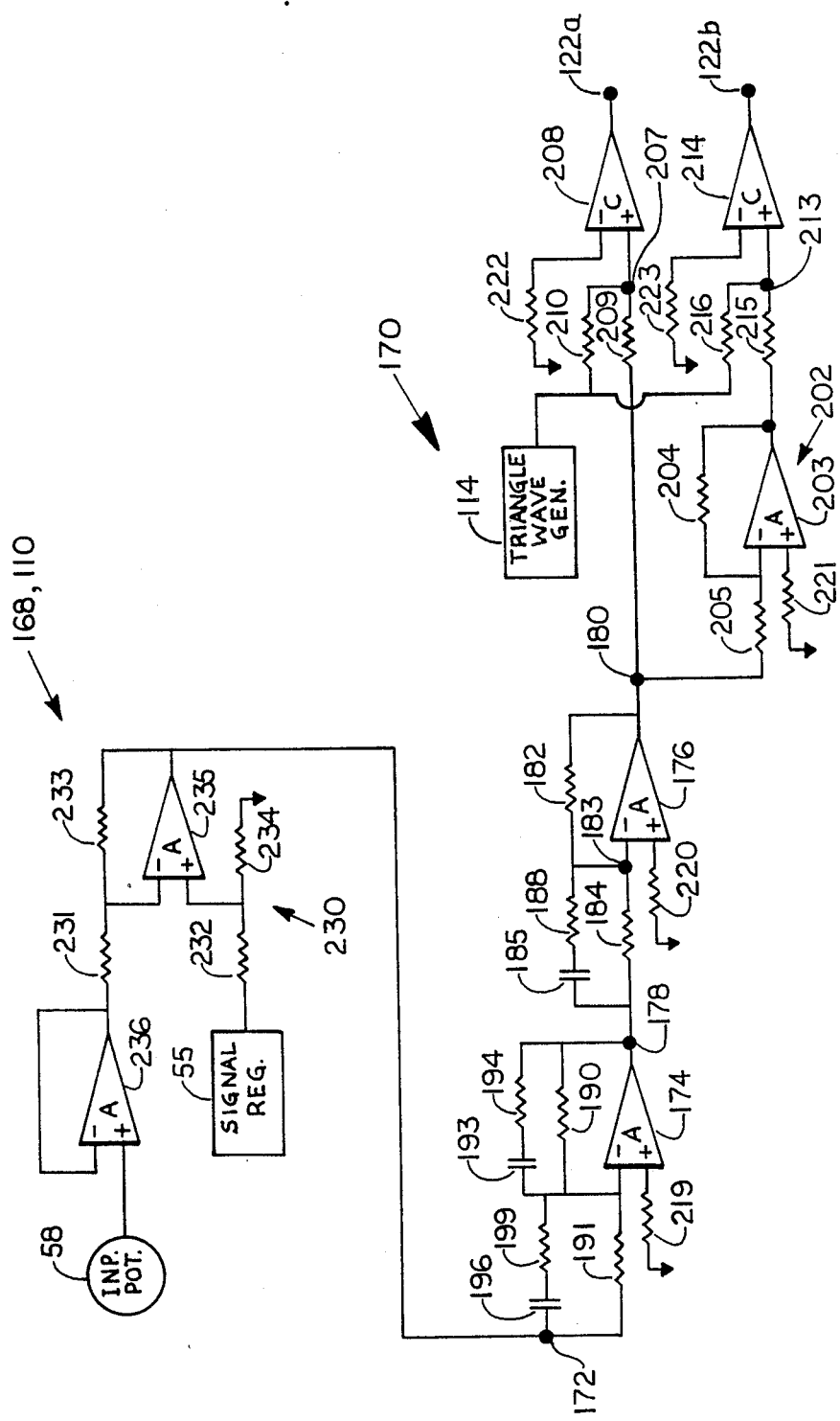
FIG. 15 is a circuit diagram of a summing point and compensation amplifier of the improved power steering system.

Shown in FIG. 15 are circuits 168 and 170 which are used for the summing point 110 and compensating amplifier 112, respectively. Correction for the phase lag introduced by the mechanical and electrical time constants of the servo motor 16 is a fundamental task of the circuit 170. Output signals from the circuit 168 are input to the circuit 170 at junction 172. Amplifiers 174 and 176 serve as first and second differentiators with time constants of 0.0015 and 0.01 seconds, respectively, wherein the amplifiers 174 and 176 and certain of their surrounding passive components contribute phase advances to counteract corresponding phase lags introduced by the electrical and mechanical time constants, respectively, of the servo motor 16. In addition, the amplifier 174 also serves to increase the loop gain by a factor of ten at very low frequencies.

The low frequency amplification provided by the amplifier 176 between junctions 178 and 180 is determined by the value of the ratio −R182/R184. This is because the amplifier 176 maintains the signal at junction 183 at ground potential via R220, and current flow through R184 also flows through R182 at low frequencies. If R182=R184=100 kohms, the corresponding low frequency gain is −1. If C185=0.1 mf, the product R184C185=0.01 sec. results in a time constant of 0.01 seconds. The significance of this is that a "zero" is introduced at 100 rad./sec. (equal to 1/0.01 sec.) which counteracts a "pole" at 100 rad./sec. which is due to the mechanical time constant of 0.01 seconds of the servo motor 16. For frequencies above 100 rad./sec., the impedance (1/wC185) of 0185 is less than R184 and inversely proportional to frequency. This linearly increases the gain between junctions 178 and 180 and contributes a phase lead of 45 degrees at 100 rad./sec. which grows to 90 degrees at 1000 rad./sec.

Figure 16:
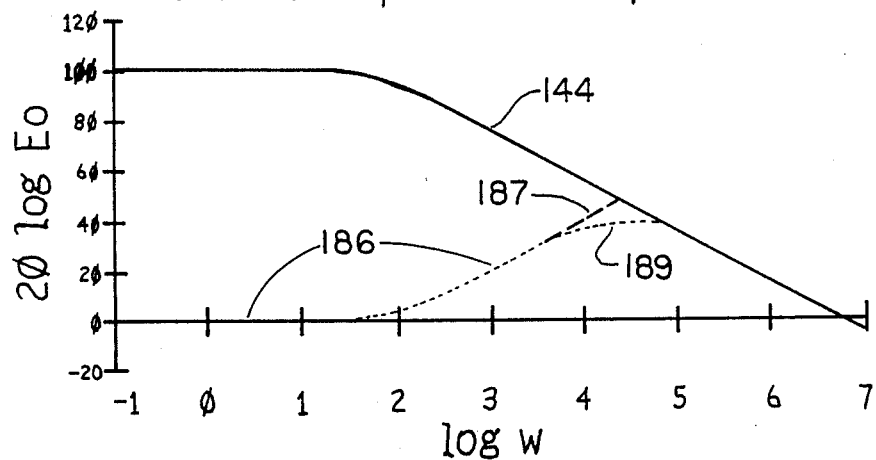
FIG. 16 is a Bode plot of the amplitude of signal levels associated with a second compensation amplifier used within the compensation amplifier.

Shown in FIG. 16 is a Bode plot of the amplifier 176 with the magnitude of the value of the gain between junctions 178 and 180 superimposed thereon. Curve 186 depicts the increased gain described above. However, the difference between the curve 144 and the curve 186 depicts the net gain of the amplifier where two pole roll-off at unity gain cross-over would result in amplifier oscillation—if the increasing gain was allowed to continue until an extension portion 187 of the curve 186 intersected the curve 144. This would result in oscillation of the amplifier 176 at approximately 25 krad./sec. This problem is alleviated by introducing R188=1.3 kohm in series with C185. This introduces a pole at 7.7 krad./sec. thus yielding a rolled-off extension portion 188 of the curve 186 and a nominal single pole roll-off at unity gain cross-over with stable operation.

Figure 17:
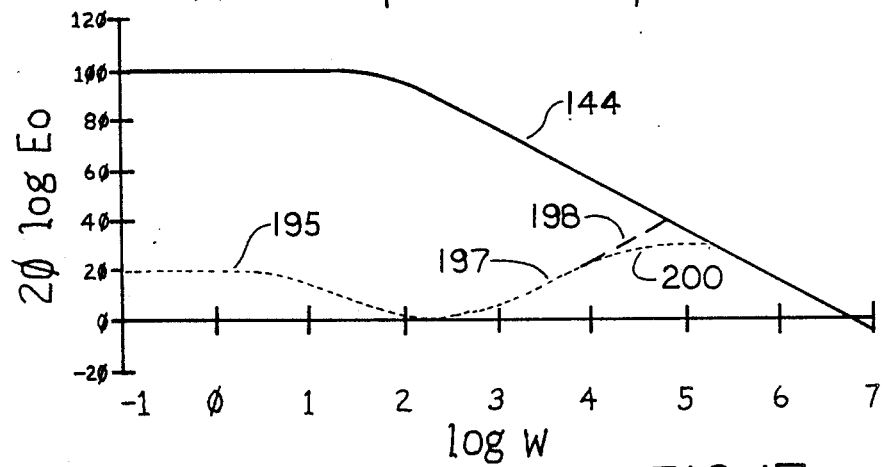
FIG. 17 is a Bode plot of the amplitude of signal levels associated with a first compensation amplifier used within the compensation amplifier.

The low frequency amplification provided by the amplifier 174 between junctions 172 and 178 is determined by the ratio −R190/R191. This is because the amplifier 174 maintains the voltage at junction 192 at ground potential via R219 and current flow through R191 also flows through R190 at low frequencies. If R190=1 Mohm and R191=100 kohms, a corresponding low frequency gain of 10 is achieved. If C193=0.15 mf, then R190C193=0.15 sec. Thus, a pole is introduced at 6.7 rad./sec. If R194=110 kohms, the expression R190R194C193/R190+R194)=0.015 sec. Thus, a zero is introduced at 67 rad./sec. Shown in FIG. 17 is a Bode plot of the amplifier 174 with the absolute value of the gain between junctions 172 and 178 superimposed thereon. Curve 195 depicts the low frequency gain described above.

C196=0.015 mf, which yields another zero at 670 rad./sec. This is illustrated by curve 197 in FIG. 17. Similar to the case described above, this zero is introduced to counteract a pole at 670 rad./sec. which is due to the electrial time constant (0.0015 sec.) of the servo motor 16. Also similar to the case described above, a two pole roll-off at unity gain cross-over would result if the increasing gain was allowed to continue until an extension portion 198 of the curve 197 intersected the curve 144—whereupon the amplifier 174 would oscillate at approximately 59 krad./sec. Thus, R199=3.3 kohm is placed in series with C196. This introduces a pole at approximately 20 krad./sec.—thus yielding a rolled-off extension portion 200 of the curves 195 and 197, and therefore a nominal single pole roll-off at unity gain cross-over with stable operation.

The signal generated by the amplifier 176 at the junction 180 is in phase with the signal at the junction 172 because of the successive voltage inversions by the amplifiers 174 and 176. Thus, it comprises the buffered output signal called for above. The buffered output signal present at the junction 180 is inverted by an inverting amplifier 202. The amplification provided by amplifier 203 is determined by the ratio −R204/R205. If R204=R205=100 kohms, the gain of the inverting amplifier is −1 and an inverted output signal is present at junction 206. This inverted output signal comprises the inverted output signal that is also called for above.

The buffered output signal is input to a summing junction 207 at the positive input terminal of a comparitor 208 via R209. The triangle wave signal generated by the triangle wave generator 114 is input to the summing junction 207 via R210. The negative input terminal of the comparitor 208 is at ground potential via R222 and both R209 and R210 have the same value (i.e., R209=R210=100 kohms). Thus, whenever the algebraic sum of the value of the buffered output signal and the value of the triangle wave signal is positive, the comparitor 208 outputs a V+ signal at junction 212. Conversely, whenever that algebraic sum is negative, the comparitor 208 outputs a V− signal at the junction 212. Thus, the signal present at the junction 212 comprises the first PWM signal called for above.

Similarly, the inverted output signal is input to a summing junction 213 at the positive input terminal of a comparitor 214 via R215. The triangle wave signal generated by the triangle wave generator 114 is input to the summing junction 213 via R216. The negative input terminal of the comparitor 208 is at ground potential via R223 and both R215 and R216 have the same value (i.e., R215=R216=100 kohms). Thus, whenever the algebraic sum of the value of the inverted output signal and the value of the triangle wave signal is positive, the comparitor 214 outputs a V+ signal at junction 218. Conversely, whenever that algebraic sum is negative, the comparitor 214 outputs a V− signal at the junction 218. Thus, the signal present at the junction 218 comprises the complementary second PWM signal also called for above.

The values of R219, R220, R221, R222 and R223 are chosen so that the effect of any bias current flowing through them nominally balances bias current flowing through the parallel combinations of the various resistors that are connected to the other of the input terminals of the amplifiers 174, 176 and 203, and the comparitors 208 and 214, respectively. To accomplish this, resistance values are chosen that nominally equal resistance values of the above described parallel combinations. Thus, R219=91 kohms and R220=R221=R222=R223=47 kohms.

Figure 18A:
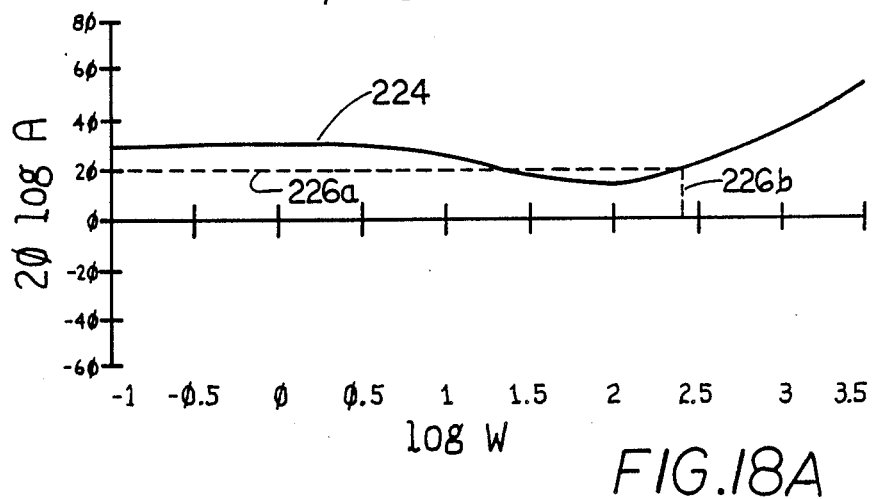
FIGS. 18A and 18B are Bode plots of the amplitude and phase gain, respectively, of the compensation amplifier.
Figure 18B:
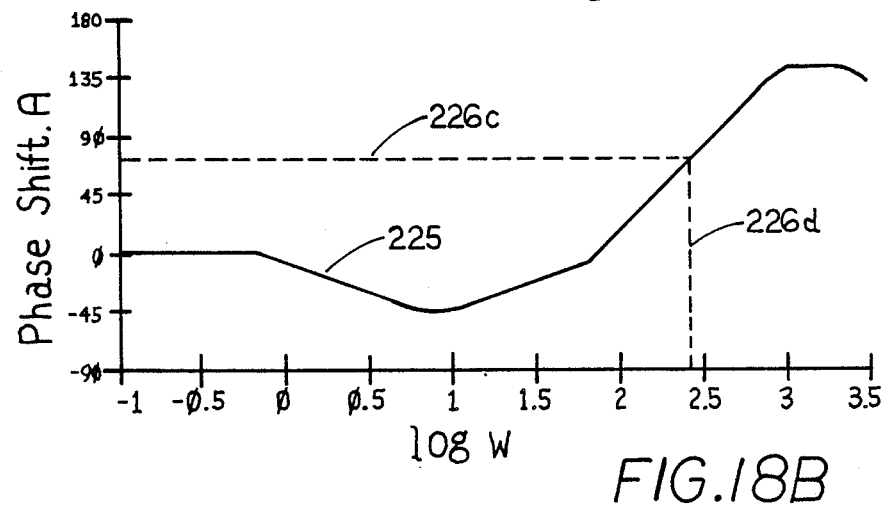

As described above, the first and second PWM signals are utilized to control the PWM power signal generator 120. The combined gain of the pulse width modulation portions of the compensating amplifier 112 and the PWM power signal generator was shown to be approximately equal in value to 3. Shown by curves 224 and 225 in FIGS. 18A and 18R, respectively, are the gain and phase shift, respectively, of the combination of the compensation amplifier 112 and the PWM power signal generator 120. Of particular significance are the positive phase shift values contributed by the compensating amplifier 112 at higher frequencies. For instance, dashed lines 226c and 226d indicate a phase shift of approximately 74 degrees at log w=2.41 whereat the servo motor has a phase shift of −180 degrees. Thus, if these elements were combined, a phase shift of −106 degrees would result. Dashed lines 226a and 226b indicate a gain of approximately 18.5 or 8.4 at log w=2.41.

Figure 19:
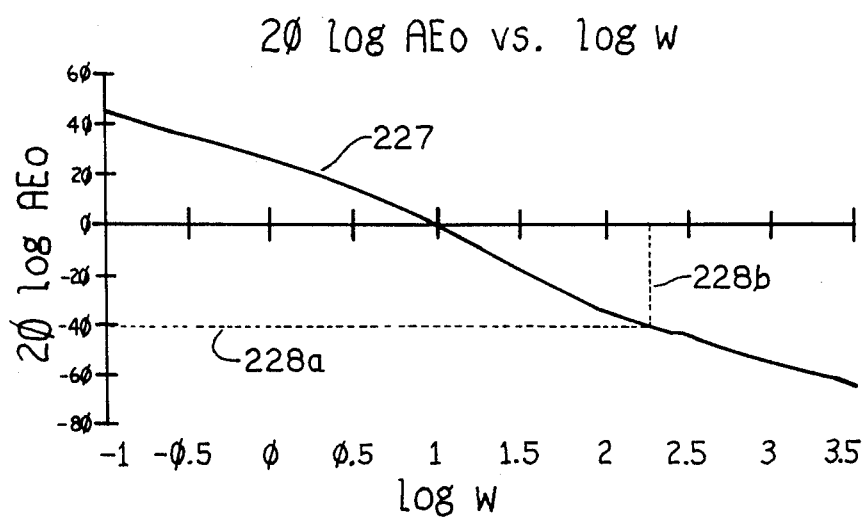
FIG. 19 is a Bode plot of the amplitude of the signal levels shown in FIG. 3A multiplied by the gain of the compensation amplifier.

The PWM power signal generator 120 drives the servo motor 16. The rotational position of the armature 49 of the servo motor 16 is indicated by the output signal level of the potentiometer 58. Shown by curve 227 in FIG. 19 is the combined gain of the compensation amplifier 112, the PWM power signal generator 120, the servo motor 16, the anti-backlash gear set 60 and the potentiometer 58. Dotted lines 228a and 228b indicate a gain of approximately −40.9 db at 30 Hz (for which log w=2.28). Thus, it is possible to increase gain by 40.9 db, or a factor of 111. This would result in unity gain cross-over occurring at approximately 30 Hz.

Referring again to FIG. 15, a differential amplifier 230 utilizing an amplifier 235 is used for the summing point 110. It is possible to select resistor values for use in the differential amplifier 230 so as to increase the value of forward gain, G, of the combination of the summing point 110, the compensating amplifier 112, the PWM power signal generator 120, the servo motor 16, the anti-backlash gear set 60 and the potentiometer 58 as desired. In the differential amplifier 230, a gain of 111 is obtained by selecting R231=R232=8.2 kohms and R233 =R234=910 kohms. Differential summing action is obtained in the differential amplifier 230 by applying the output signal of potentiometer 58, as buffered by a voltage follower 236, to the negative input terminal of the amplifier 235 via R231 and the output signal of the signal regulator 55 to the positive input terminal of the amplifier 235 via R232.

Figure 20A:
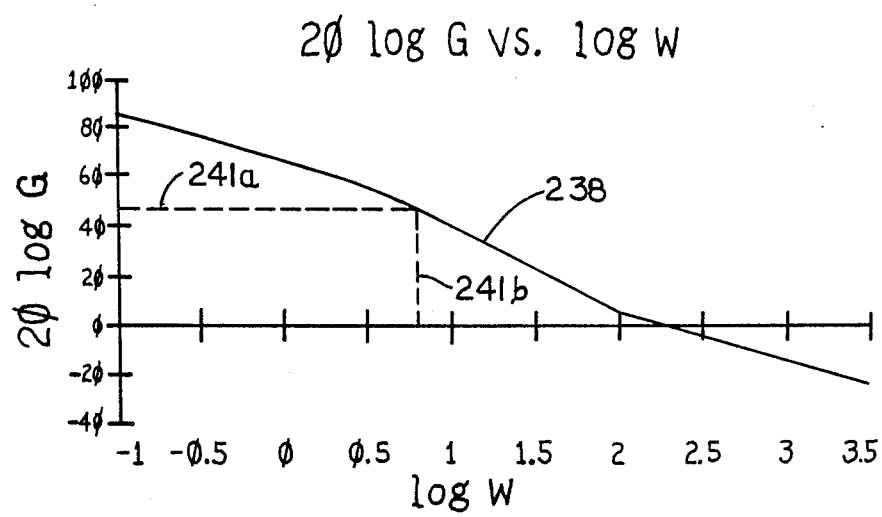
FIGS. 20A and 20B are Bode plots of the amplitude and phase gain, respectively, of the combined forward gains of the servo control unit, the servo motor and the servo motor driven potentiometers.
Figure 20B:
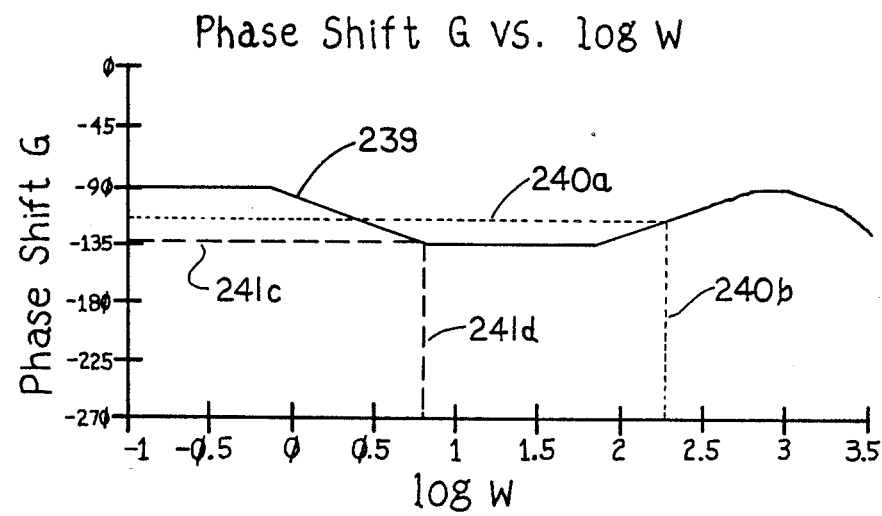

Shown by curves 238 and 239 in FIGS. 20A and 20B, respectively, are values of the forward gain G and phase shift of the forward gain G. Dotted lines 240a and 240b in FIG. 20B indicate an approximate phase shift of −114.5 degrees at unity gain cross-over. Dashed lines 241a and 241b in FIG. 20A indicate an approximate gain of 213 at 1 Hz (20 log G =46.6 and log w=0.8). This gain value is approximately 26 times the value shown in FIG. 14. Part of this increase in gain is due to the additional low frequency gain enabled by inserting the pole at 6.7 rad./sec. and the zero at 67 rad./sec. as shown in FIG. 17. As a consequence of using this combination of additional pole and zero, additional phase shift values are encountered between these frequencies. For instance, dashed lines 241c and 241d in FIG. 20B indicate an approximate phase shift of −134 degrees at 1 Hz (6.28 rad./sec.).

Not accounted for in the above analysis is the phase shift due to the dead time associated with the pulse width modulation. There is an average value of 114 microseconds of such dead time (from the inverse of 4 times 2.2 kHz). This results in an approximate −1.2 degrees of additional phase shift at 30 Hz for a total value of −115.7 degrees at gain cross-over.

A thorough discussion of the principles involved in feedback control of this type can be found in a book entitled CONTROL SYSTEM DESIGN by C. J. Savant, Jr., Ph.D. and published by McGraw-Hill, Inc. In that book, the closed loop performance of the complete servo loop is shown to be $C/R=G/(1+CH)$. Herein C is the value of the output signal of the potentiometer 58, R is the value of the input signal from the signal regulator 55, G is the forward gain (as derived above), and H is the gain of a feedback path 240 connecting the potentiometer 58 with the summing point 110. Since no circuit elements are present within the feedback path 240, H=1 and $C/R=G/(1+G)$ herein. Thus, at 1 Hz, $C/R=213/214=0.9953$. Or, at 1 Hz there exists an error of only $1−213/214=0.0047$.

Figure 21:
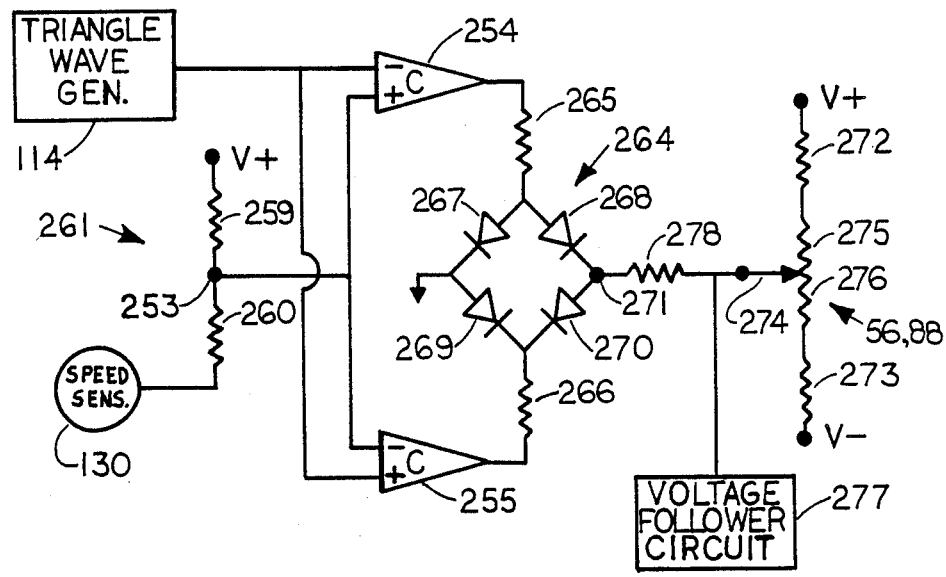
FIG. 21 is a circuit diagram of a switching circuit utilized to effect speed control of the output signal of the first potentiometer.
Figure 22A:
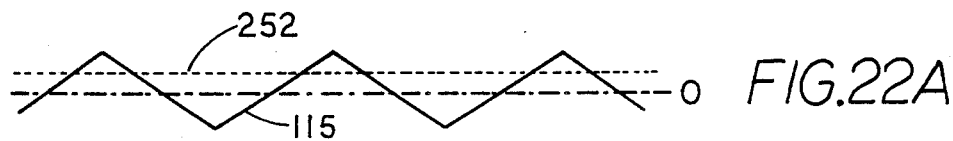
FIGS. 22A, 22B and 22C are graphs which illustrate input signal waveforms which are applied to positive and negative comparators, and positive and negative PWM signals which are generated thereby.
Figure 22B:
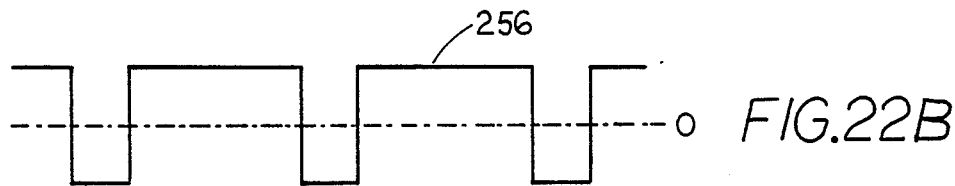
Figure 22C:
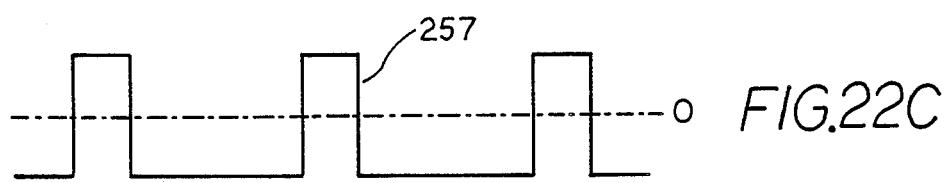

Shown in FIG. 21 is a switching circuit 250 that is used for implementing each of the signal regulators 55 and 87. Switching operations of the switching circuit 250 are illustrated by FIGS. 22A, 22B and 22C. Curve 115 depicts the triangle wave signal generated by the triangle wave generator 114 and input to the switching circuit 250. Dotted line 252 depicts a value of summed signals which are derived from the speed sensor 130 and V+. This value of the summed signals, which is present at a junction 253, is compared with the triangle wave signal value (shown by the curve 115) by positive and negative comparitors 254 and 255, respectively. The positive and negative comparitors 254 and 255 generate positive and negative PWM switching signals, respectively, as depicted by curves 256 and 257, respectively.

Figure 23:
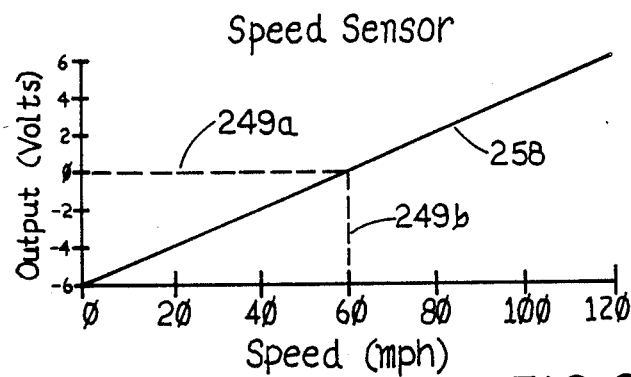
FIG. 23 is a graph which illustrates an output signal of a speed sensor utilized by the switching circuit shown in FIG. 21.

Shown by curve 258 in FIG. 23 are signal values that are input to the switching circuit 250 by the speed sensor 130 as a function of vehicular speed. They range from −6 volts at 0 miles per hour to +2 volts at 80 miles per hour. For instance, dashed lines 249a and 249b indicate a signal value of 0 volts at 60 miles per hour.

The dotted line 252 in FIG. 22A shows a desired signal level, of about half of the positive peak signal of the triangle wave signal, for 60 miles per hour. Such a signal level would result in the desired modulation illustrated by the curves 256 and 257 in FIGS. 22B and 22C, respectively.

The approximate range of signal values of the triangle wave is −4 volts to +4 volts. Since it is desired to compare these two signals directly with 0 miles per hour corresponding to the −4 volt signal portion of the triangle wave, the equivalent of 2 volts is added to the output signal from the speed sensor 130. Then the comPared signal levels will range from the minimum signal value to the maximum signal value of the triangle wave over a vehicular speed range of 0 miles per hour to 80 miles per hour, respectively. The result will be a pulse width modulation of the positive and negative PWM switching signals that varies from 0 percent at a vehicular speed of 0 miles per hour to 100 percent at a vehicular speed of 80 miles per hour.

This desired result is achieved by passing current from V+ into the speed sensor 130 via a voltage divider 261. Thus, the value of the signal at the junction 253 can be increased by the required 2 volts. R259 and R260 are selected by ratio of values such that R259/R260=5 with R259=150 kohms and R260=30 kohms.

The Positive and negative PWM output signals from the comparitors 254 and 255, respectively, are utilized to drive current through a diode bridge 264 via resistors 265 and 266 when they are in their "on" states, and then reverse bias the diode bridge and stop all current flow therethrough when they are in their "off" states. This serves to place each one of diodes 267, 268, 269 and 270 first into a conductive state and then into an off state as the positive and negative PWM signals are modulated. Thus, the diode bridge 264 becomes a solid state switch which connects terminal 271 to ground potential whenever it is turned on and disconnects the terminal 271 from ground potential whenever it is turned off. In this manner, the positive and negative PWM signals are utilized to modulate a time fraction, m, when R278 is connected to ground potential at the terminal 271 (as a linear function of vehicular speed).

Current passes from V+ through R272=33 kohms, either of the potentiometers 56 or 88 (whose series resistance values are R56=R88=150 kohms), and R273 =33 kohms to V−. Whenever the diode bridge 264 is turned off, voltage signals are sampled by a voltage follower circuit 277 via a slidewire 274 of either of the potentiometers 56 or 88. The value of this signal is determined by the position of the slidewire 274 along R56 or R88 as in a simple resistive voltage divider network comprising R272 and a first portion R275 (on the positive side of the slidewire 274), and a second portion R276=R56−R275 or R276=R88−R275 (on the negative side of the slidewire 274) and R273. Thus, (assuming a battery voltage of 12 volts) the range of signals at the slidewire 274 will be −4.167 volts to +4.167 volts. This occurs when m=0 and the upper steering shaft 12 is rotated one turn in either direction.

Assuming that the gain of the voltage follower circuit is 0 db (an assumption which will be confirmed below), the maximum signal value input to the summing point 110 is also plus or minus 4.167 volts. Since the feedback loop causes the signal level from the potentiometer 58 to match this value for all cases, the value of plus or minus 4.167 volts assumed hereinabove as the maximum signal value from the potentiometer 58 is also confirmed.

During the time fraction m when the diode brige 264 is turned on, voltage signals sampled by the voltage follower circuit 277 are suppressed to values closer to ground potential because some of the current flowing through R56 or R88 is diverted through R278=10 kohms (for non-centered positions of the slidewire 274) to ground potential. Thus, the magnitudes of average voltage signals sampled by the voltage follower 277 have maximum values at 0 miles per hour where m=0, and then linearly decrease with higher pulse width modulation percentages at higher vehicular speeds to minimum values at 80 miles per hour where m=1.

Positions of the points generating the curves 64, 65, 68, 70 and 72 shown in FIG. 3 are calculated with reference to the average of the values of signals present on the slidewire 274. Any particular value, E, of the average of the values of signals present on the slidewire 274, is calculated by summing the product of the value of a voltage signal, E' (which is present on the slidewire 274 when the diode bridge 264 is turned on), and m with the product of the value of a voltage signal, E" (which is present on the slidewire 274 when the diode bridge 264 is turned off), and (1−m).

Values of the voltage signal E' (again assuming a 12 volt battery) can be found by simultaneously solving $$I275(33+R275)=6-E',$$

$$I276(33+R276)=6+E',$$

$$R276=150-R275,$$

$$I274(1-0)=-E' \text{ and}$$

$$I275+I274=I275$$

where I275, I276 and I274 are currents flowing in R275, R276 and the slidewire 274, respectively, the numbers 150, 33 and 10 have dimensions of kohms and the number 6 has the dimension volts. Solving these equations results in $$E'=(900-12R275)/(819.9+15R275-0.1R275\times R275).$$

Evaluating this equation to solve for signals at the slidewire 274 when m=1 results in a voltage range of −1.098 volts to +1.098 volts.

The value of the voltage signal E" is found from $$E''=(900-12R275)/216$$

where the number 900 has the dimension volt-kohms, the number 12 has the dimension volts and the number 216 has the dimension kohms. The value of the average of the values of signals present on the slidewire 274 is $$E=mE'+(1-m)E''.$$

The number of turns of the steering wheel is determined by $$NTsw=(75-R275)/75$$

where NTsw is the number of turns of the steering wheel and the number 75 has the dimensions of kohms.

The ratios of the internal differential planetary gear train 25 and the anti-backlash gear set 60 together with the characteristics of the potentiometers 58 and 90 are chosen such that the number of turns of the ring gear 24, NTrg, is determined by $$NTrg=1.75E/4.167$$

where the number 1.75 has the dimension turns (and is the maximum value of NTrg), and the number 4.167 has the dimension volts (and is the maximum value possible for the filtered voltage signal at m=0 as derived above).

The number of turns of the steering gear 18, Nsg, is determined by $$NTsg=NTsw/3+2NTrg/3$$

where NTsw is the number of turns of the steering wheel 14 and NTrg is the number of turns of the ring gear 24 (which have maximum values of 1 turn and 1.75 turn, respectively). Evaluating this equation with these maximum values results in a corresponding maximum value of NTsg=1.5.

A more general numerical example wherein the value of NTsg for a point 69 on the curve 68 (corresponding to NTsw=0.5 turn) is calculated as follows: shown in the curve 68 are values of NTsg for a vehicular speed of 40 miles per hour. Thus, m=0.5 and R275=37.5 kohms. It then follows that E'=0.362 volts, E"=2.083 volts, E=1.223 volts, NTrg=0.513 turns and, finally, NTsg=0.509 turns.

Figure 24:
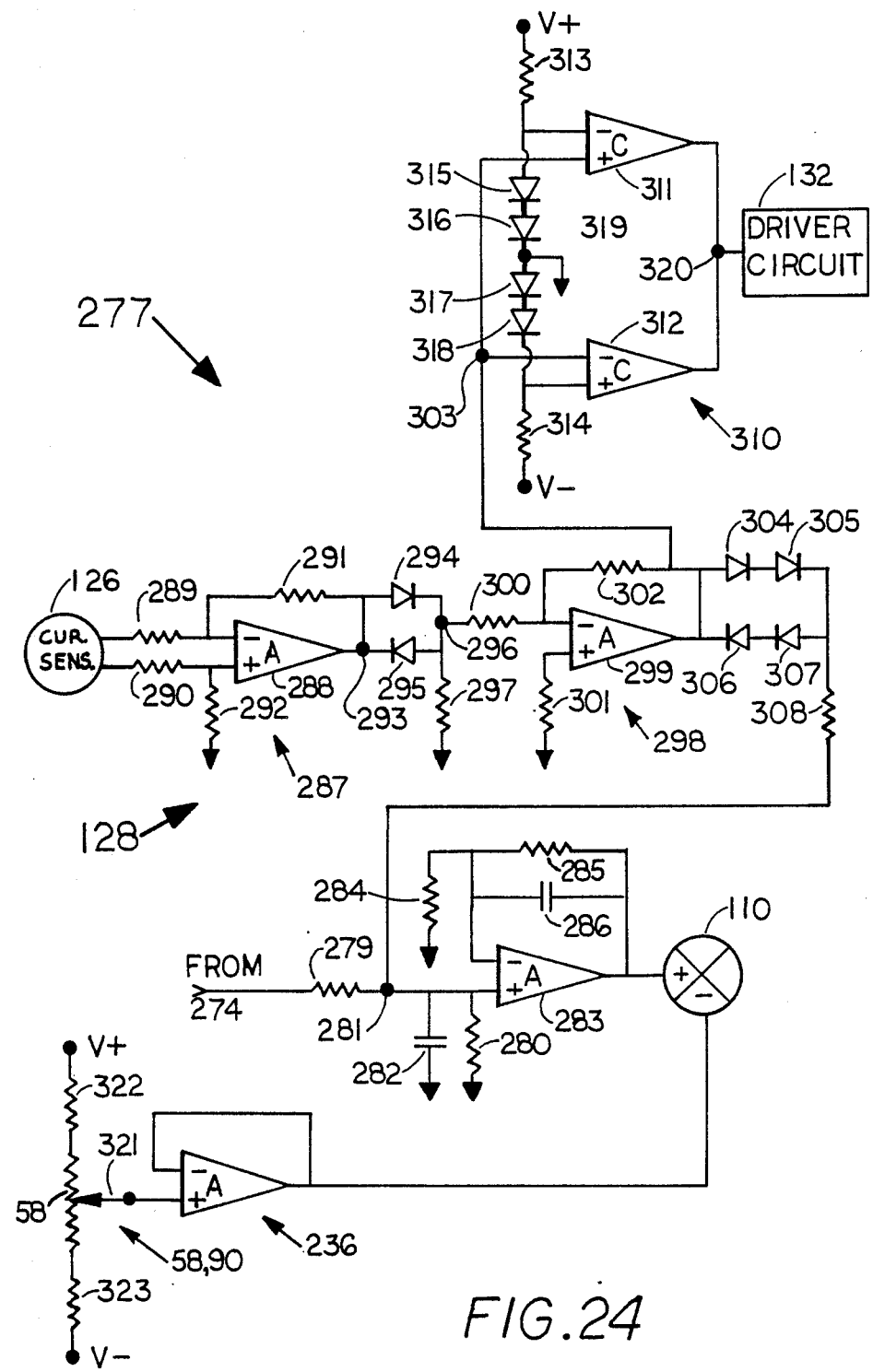
FIG. 24 is a circuit diagram of a voltage follower circuit that is utilized within the switching circuit of FIG. 21.

Shown in FIG. 24 is the voltage follower circuit 277 which samples voltage signals at the slidewire 274. A primary purpose of the voltage follower circuit 277 is to substantially remove the 2.2 kHz component from the pulse width modulated signal at the slidewire 277. This is accomplished by a two pole low pass filter which comprises R279=100 kohms, R280=20 kohms, C283=0.033 mf, amplifier 283, R284=20 kohms, R285=100 kohms and C286=0.0068 mf. In this low pass filter, a first pole at 1,515 rad./sec. (241 Hz) due to R280 and C282 is complemented by a second pole at 1471 rad./sec. (234 Hz) due to R285 and C286.

Since this circuitry is not included within the feedback loop, it has no effect on stability of the feedback loop. However, it does contribute two poles between the vehicle's operator and the steering gear 18. Its effect at 1 Hz is calculated as follows:

At 0 Hz, the series combination of R279 and R280 results in a "gain" at junction 281 of 0.1667. Similarly, utilizing R284 from the negative input terminal of the amplifier 283 to ground potential and R285 as a feedback element around the amplifier 283 results in a gain of 6 from the junction 281 to the positive input terminal of the summing point 110. Thus, the total gain from the slidewire 274 to the positive input terminal of the summing point 110 is 1 at 0 Hz. (And, verifies another assumption made hereinabove.)

However, at 1 Hz, the parallel combination of R280 and C282 has an imPedance of 19.917 kohms. This modifies the "gain" at junction 281 to 0.1661. At 1 Hz, the parallel combination of R285 and C286 has an impedance of 99.575 kohms. This modifies the gain of 6 to a gain of 5.9787. Thus, the total gain from the junction 281 to the input terminal of the summing point 110 is 0.9930 at 1 Hz. Thus, an additional error of 0.0070 between the vehicle's operator and the steering gear 18 is contributed by the two pole low pass filter. When added to the 0.0047 error due to the servo loop, this results in a total error of 0.0117 or just slightly above 1 percent.

The voltage follower circuit 277 also incorporates the window exclusion amplifier 128. The window exclusion amplifier 128 is used (whenever current demanded by the servo motor 16 becomes excessive) to suppress the value of the signal at the junction 281. This results in reducing the total gain values described above and suppresses the signal value input to the summing point 110 in order to provide current limiting.

Current measurement signals from the current sensor 126 are low level differential signals whose magnitude becomes approximately 0.06 volts at the threshold of excessive current values, and whose polarity is indicative of excessive current direction. The low level differential signals are amplified by a differential amplifier 287 which comprises an amplifier 288, input resistors R289=R290=20 kohms and feedback resistors R291=R292=200 kohms. Thus, amplified current measurement signals at junction 293 are amplified by a factor of 10 with a polarity indicative of current direction.

When the magnitude of the output signal at the junction 293 is greater than 0.6 volts in value, one of diodes D294 or D295 will turn on and couple the output signal at the junction 293 to junction 296 at a signal level decreased in magnitude by 0.6 volts. (At lower output signal values the junction 296 is held at ground potential by R297=100 kohms.) Thus, when the current demanded by the servo motor 16 becomes excessive, a non-ground potential signal at the junction 296 is amplified by an inverting amplifier 298. The inverting amplifier 298 comprises amplifier 299, R300=R301=10 kohms and R302=390 kohms. Thus, the signals on the junction 296 are amplified by a factor of 39 and output to junction 303 by the inverting amplifier 298.

The signal at the junction 303 is normally substantially at ground potential. Thus, the maximum signal value possible at the junction 281 (4.167/6=0.694 volts) is normally blocked by diodes 304 and 305, or 306 and 307, and no current flows through R308=4.7 kohms. When the signal at the junction 303 is not at ground potential and the magnitude of the differential value between the signals at the junction 303 and the junction 281 exceeds 1.2 volts, current flows through R308. The polarity of the differential current measurement signal input to the differential amplifier 287 is chosen such that the signal value at the junction 281 is suppressed by the current flowing through R308 in a direction that results in reduced current flow through the servo motor 16.

The signal at the junction 303 is also input to a window comparitor 310. The window comparitor 310 comprises comparitors 311 and 312, R313=R314=100 kohms, and diodes D315, D316, D317 and D318. Current flows from V+ through R313, D315, D316, D317, D318 and R314 to V−. Junction 319 between D316 and D317 is at ground potential. Thus, signal values at the negative input to the comparitor 311 and positive input to the comparitor 312 are plus and minus 1.2 volts, respectively. For signal values having a magnitude less than 1.2 volts at the junction 303, an output signal of V− is present at junctIon 320. For signal values having a magnitude greater than 1.2 volts at the junction 303, an output signal of V+ is input to the driver circuit 132 via the junction 320 whereby the alarm 51 is activated.

The output signal of the voltage follower circuit 277 is input to the positive input terminal of the summing amplifier 110 where it is compared with a signal from the potentiometer 58 as buffered by the voltage follower 236. It is important that the signals sampled by slidewire 321 of the potentiometer 58 always be derived from within the linear range of the potentiometer 58. Current flows therein from V+ to V− via R322=27 kohms, R58=150 ohms and R323=27 kohms. Thus, the voltage range available to the slidewire 321 exceeds the voltage range available to the slidewire 274.

To compensate for the extended linear range of the potentiometer 58, the physical angular extent of its linear range is chosen commensurate with the ratios of the anti-backlash gear set 60 and the internal differential planetary gear train 25 such that the ring gear rotates 1.85 turns as the slidewire 321 moves from center position to either end of the linear range on the potentiometer 58. Specifically, this results in 0.82(360)1.85/1.75=312 electrical degrees of rotation for the linear range of the potentiometer 58 (and the potentiometer 90 as well).

Figure 25:
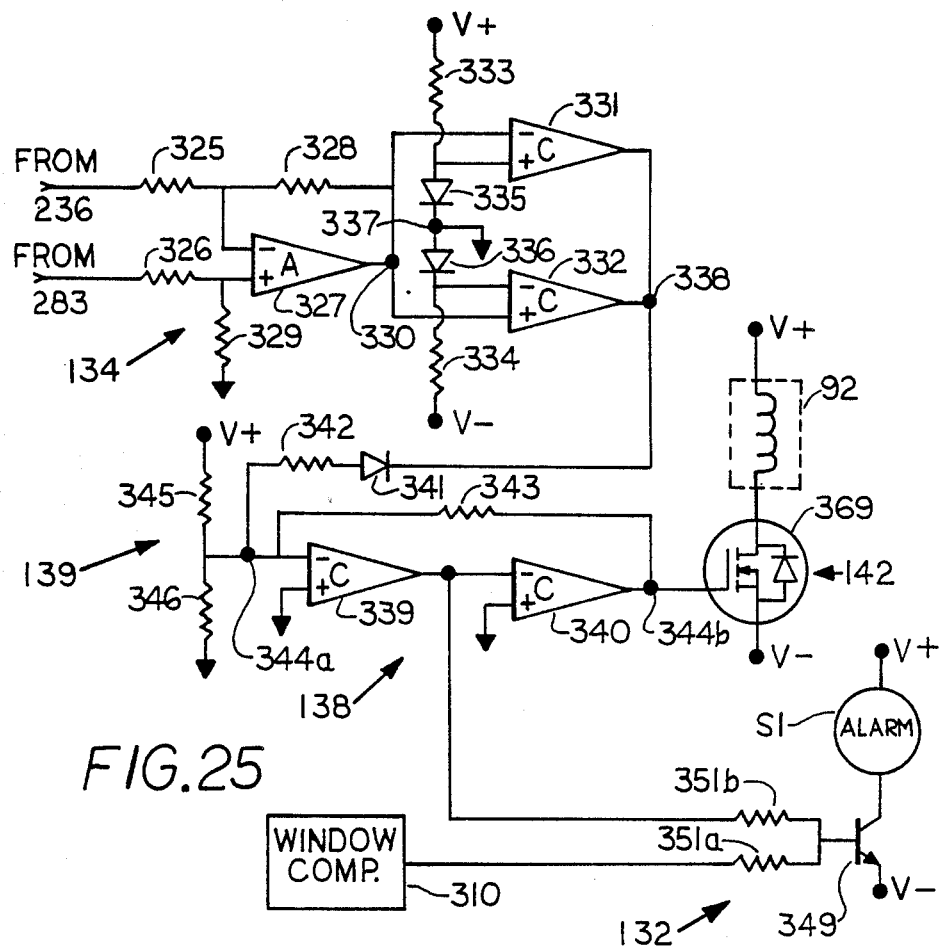
FIG. 25 is a circuit diagram of circuitry utilized to effect the operation of a fail-safe safety system in the improved power steering system.

Shown in FIG. 25 is remaining circuitry comprising the summing point 134, the window comparitor 136, the flip flop circuit 138 and the driver circuits 132 and 142. Output signals from the voltage follower 236 and the amplifier 283 of the signal regulator 87 are input to negative and positive input terminals of the summing point 134, respectively, via R325=20 kohms and R326=20 kohms, respectively. The summing point 134 additionally comprises an amplifier 327 and R328=R329=200 kohms. Thus, the output signal from the summing point 134 at junction 330 is amplified by a factor of 10.

The junction 330 serves as an input terminal for the window comparitor 136. The window comparitor 136 comprises comparitors 331 and 332, R333=R334=100 kohms and diodes D335 and D336, Current flows from V+ to V− via R333, D335, D336 and R334. Junction 337 is at ground potential. Thus the positive input terminal of the comparitor 331 and the negative terminal of the comparitor 332 have signal values of plus and minus 0.6 volts, respectively. Normally, the magnitude of signal values at the junction 330 are less than 0.6 volts and the resulting output signal on junction 338 is V+. If the signal values input to the summing point 134 should differ by more than 0.06 volts, then the magnitude of the voltage at the junction 330 will exceed 0.6 volts and the signal at the junction 338 will become V−.

The junction 338 serves as an input terminal for the flip flop circuit 138 which comprises comparitors 339 and 340, diode D341, R342=2 kohms and R343=10 kohms. When the ignition switch 9 is turned on, the voltage divider 139, which comprises R345=1 mohm and R346=100 kohms, sets junction 344a above ground potential. This causes junction 347 to be at V− which, in turn, causes the junction 344b to be at V+. This is the activated state of the flip flop circuit 138. The V+ signal at the junction 344b turns on the driver circuit 142, which activates the coil of the contactor 92.

If the signal at the junction 338 becomes V−, reverse current will flow through D341 and R342. Since R342 is much lower resistance than R343 or R345, the junction 344a will be pulled below ground potential. This causes the junction 347 to be at V+ which, in turn, causes the junction 344b to be at V−, which is the deactivated state of the flip flop circuit 138. Furthermore, this state is held until the ignition switch 9 is turned off (which faults positive rail 348 to V− via a conductor 7 as shown in FIG. 1) and then back on. The V− signal at the junction 344b turns the driver circuit 142 off, which deactivates the coil of the contactor 92. Further, the V+ signal at the junction 347 turns on the driver circuit 132, which activates the alarm 51.

(The driver circuit 132 can also be turned on by the window comparator 310 as noted above. If different alarm signals are desired for system deactivation (via the V+ signal on the junction 347) and excessive current (via the window comparator 310), different alarms could be utilized and each source could drive a different driver circuit. Alternately, the window comparator 310 could be replaced by a window exclusion amplifier and a proportional driver circuit. This would result in a variable alarm signal that would grow more intense with higher values of excessive current.)

The driver circuit 132 comprises an n-p-n transistor 349 which is utilized in a common emitter mode. The transistor 349 is coupled to its respective drive sources via coupling resistors 351a and 351b.

The driver circuit 142 comprises a power device known as a power metal oxide semiconductor field effect transistor (hereinafter "power MOSFET") 369 which is utilized in a common source mode. A power MOSFET is utilized in the driver circuit because the load impedance of the coil of the contactor 92 is lower than that of the alarm 51. This would require excessive base drive current demands from the junction 344a. (Alternately, a darlington transistor pair could be used as the active element in the driver circuit 142.)

Figure 26A:
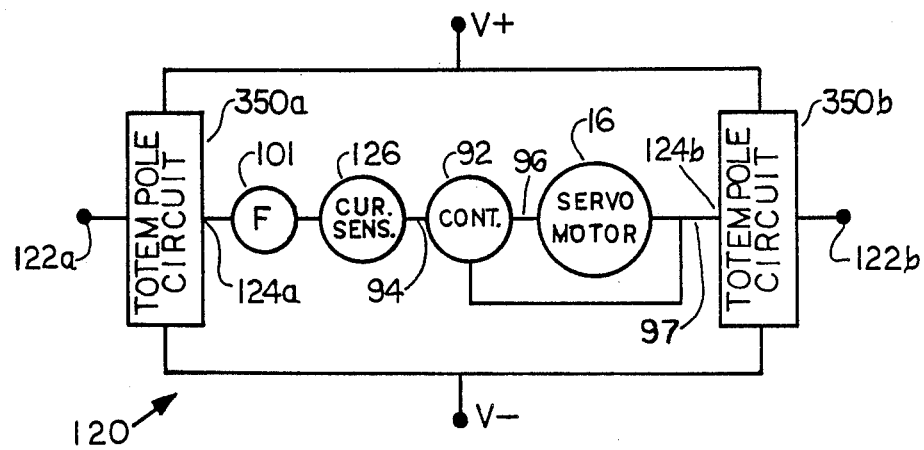
FIG. 26A is a block diagram of the PWM power signal generator circuit.
Figure 26B:
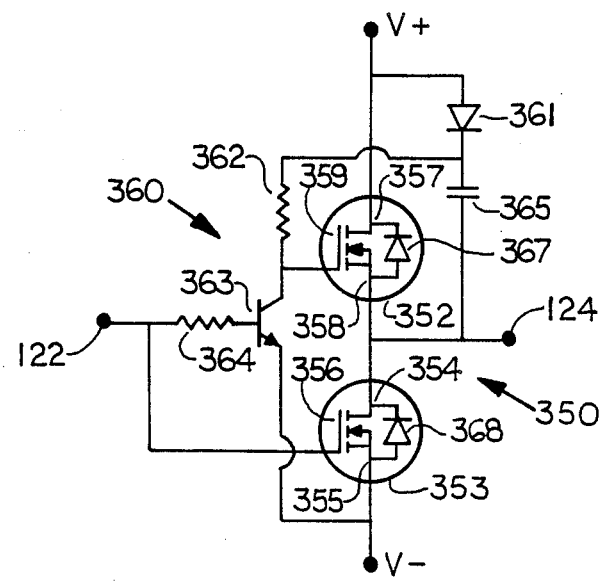
FIG. 26B is a circuit diagram of a totem pole circuit that is utilized within the PWM power signal generator circuit.

Shown in FIG. 26A is a block diagram of the PWM power signal generator 120, which comprises first and second totem pole circuits 350a and 350b arranged in an "H" bridge configuration. The first and second PWM signals are output from the compensation amplifier 112 to the input terminals 122a and 122b, respectively, of the first and second totem pole circuits 350a and 350b, respectively. The first and second totem pole circuits are switching circuits which invert each of the first and second PWM signals to form first and second PWM power signals, respectively, (whose difference is the PWM power signal) on the first and second output terminals 124a and 124b, respectively.

Shown in FIG. 268 is a detailed circuit diagram of a totem pole circuit 350 which is typical of either of the totem pole circuits 350a and 350b. The totem pole circuit 350 comprises first and second power MOSFETs 352 and 353, respectively. The function of the first power MOSFET 352 is to couple the output terminal 124 to V+ when the PWM signal on the input terminal 122 is at V−. Similarly, the function of the second power MOSFET 353 is to couple the output terminal 124 to V− when the PWM signal on the input terminal 122 is at V+.

The power MOSFET 353 is placed in a state of having very low resistance between its drain 354 and source 355 by applying a signal substantially equal in value to V+ to its gate 356 via the input terminal 122. Such a signal value on the gate 356 "turns on" the power MOSFET 354 because the source 355 is at V−. (Placing such a differential signal value from gate to source puts a Power MOSFET in a condition of conduction similar to that of a bipolar transistor in saturation.)

The power MOSFET 352 is placed in a state of having very low resistance between its drain 357 and source 358 by applying a signal greater value than V+ to its gate 359. The higher voltage is required because the source 358 is substantially at V+ when the power MOSFET 352 is turned on. In the totem pole circuit 350, this is accomplished by a bootstrapping circuit 360.

In the bootstrapping circuit 360, current flow through 0361 is derived from V+ via R362 whenever transistor 363 is turned on. The transistor 363 is turned on by current flowing through R364 whenever a signal substantially equal in value to V+ is applied to the input terminal 122. The power MOSFET 352 is concomitantly held in its "off" state because its gate 359 is nominally at V− whenever the transistor 363 is in its "on" state. Since the power MOSFET 353 is also in its "on" state when a V+ signal is applied to the input terminal 122, the output terminal 124 is at V−. Thus, C365 is charged to a voltage level of (V+ − V−).

When the signal at the input terminal 122 is changed to V−, both the power MOSFET 353 and the transistor 363 turn off. Then the gate 359 goes to a voltage level of V+. This turns the power MOSFET 352 on "softly". Thus, the signal value at the output terminal 124 rises toward V+. Concomitantly, the stored charge in C365 causes the signal on junction 366 to rise toward 3 V+. This puts a differential signal of 2 V+ between the gate 359 and the source 358, and completes turning the power MOSFET 352 on.

Forward current flow through either one of the power MOSFETs 352 or 353 is generally followed by a demand for reverse current flow in the other one of the power MOSFETs 352 or 353 as their states are switched. This is because the electrical time constant of the servo motor 16 is many orders of magnitude longer than the switching sequence times (which are in the order of 1 microsecond) for which reason the current through the output terminal 124 continues to flow in the same direction.

Fortunately, there is an inherent "parasitic" drain-source diode (of comparable current handling capability) which conducts current from source-to-drain in the power MOSFETs 352 and 353 whenever a reverse bias is applied. Thus, reverse current flow in the power MOSFETs 352 and 353 is accomodated by the inherent diodes D367 and D368, respectively.

Many other methods of providing the above described elevated drive voltage are known. (For instance, many are shown in a catalog entitled POWER MOSFET TRANSISTOR DATA available from Motorola Inc. of Phoenix, Ariz. from which company suitable power MOSFETs are available.) Applications for the bootstrapping method are somewhat limited because its output signal can not be applied for an unlimited length of time, it impresses substantially the whole supply voltage potential gate-to-source, and its "soft" turn-on characteristic can be undesirable due to power losses during switching sequences.

Similarly, alternate methods of conducting the reverse currents described above are often utilized. This is because utilization of the inherent diodes therefor can cause difficulties due to diode recovery problems. Forward biased voltage spikes similar to the whole supply voltage (V+ − V−) can be impressed upon the devices because of this factor.

None of the limitations described above is a troublesome factor herein, however. This is primarily because the power supply voltage is normally limited to 12 volts. Such a signal level approximates preferred gate drive levels. Also, minimum drain-to-source signal level specifications are generally many times 12 volts so voltage spikes are a minimal problem. Both the relatively low switching frequency rate (2.2 kHz), and the low voltage mInimize power losses during switching sequences. And, since the operation described herein comprises a switching application, unlimited on times for the bootstrapping circuit 360 are not required.

Figure 27:
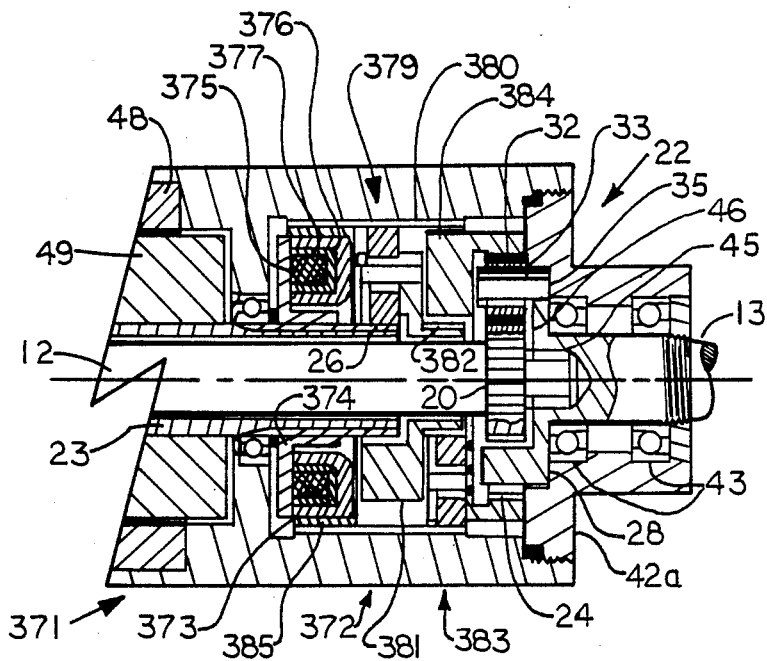
FIG. 27 is a cross-sectional view of a servo motor and gear assembly of another preferred embodiment of the present invention.

Shown in FIG. 27 is an alternate embodiment of the improved power steering system wherein an alternate type of power steering unit 371 is utilized. In the power steering unit 371, a two stage planetary gear train 372 is used instead of the internal differential planetary gear train 25 used in the power steering unit 11. Because the two stage planetary gear train 372 is reversible, a fail-safe electromagnetic brake 373 is used to hold the armature 49 of the servo motor 16 stationary whenever the signal at junction 344b is V−.

In the power steering unit 371, the armature shaft 23 and the armature gear 26 are extended and gear teeth on the armature gear 26 are also utilized as splines to engage an armature 374 of the fail-safe electromagnetic brake 373. The fail-safe electromagnetic brake is similar to a model size 170 custom design brake which is available from Warner Electric Brake & Clutch Company of South Beloit, Ill. and is described in their catalog entitled WARNER ELECTRIC MASTER CATALOG.

Generally, electromagnetic brakes of this type operate by a magnetic flux attracting the armature 374 toward a friction surface 375. Fail-safe operation of the fail-safe electromagnetic brake 373 is obtained by virtue of ceramic magnets 376 being used to generate the attractive magnetic flux. The armature 374 is released by a counter magnetic flux created by current flowing through a coil 377 from a driver circuit 378.

The two stage planetary gear train 372 comprises a first planetary gear stage 379 which includes the armature gear 26, a fixed ring gear 380 and a planetary carrier 381; and a second planetary gear stage 383 which includes a sun gear 382, the fixed ring gear 380 and a planetary carrier 384. The sun gear 382 is formed on an axial extension of the planetary carrier 381. In an example of such a two stage planetary gear train 372 which is compatible with the various other examples herein, both the armature gear 26 and the sun gear 382 have 28 teeth, and the fixed ring gear 380 has 84 teeth. Thus, the reduction ratio of each stage is 4:1 and the combined reduction ratio of both stages is 16:1.

In addition, teeth comprised in the fixed ring gear 380 are used as splines to engage a magnet structure 385 of the fail-safe electromagnetic brake 373. Thus, the magnet structure 385 of the fail-safe electromagnetic brake 373 is rotationally anchored to the housing 47. Further thus, whenever the armature 374 is attracted to the magnet structure 385, rotation of both the armatures 374 and 49 is precluded.

The ring gear 24 is formed within a cup-like axial extension of the planetary carrier 384. Since the reduction ratio from the ring gear 24 to the planetary carrier 28 of the planetary gear train 22 is 1.5:1, the overall reduction ratio between the armature 49 and the steering gear 18 is 24:1. This is slightly less than the comparable reduction ratio of 27.43:1 used in the power steering unit 11. However, the power steering unit 371 outputs comparable torque assistance values because the two stage planetary gear train 372 is more efficient in the output direction than is the internal differential planetary gear train 25. On the other hand, the number of electrical degrees of rotation comprised within the linear resistance range of the potentiometers 58 and 90 must be modified by a factor of 24/27.43=0.875 (or from 312 degrees to 273 degrees) in order to maintain the same values of the various other factors used herein. The other portions of the power steering unit 371 are identical with corresponding portions of the power steering unit 11.

Figure 28:
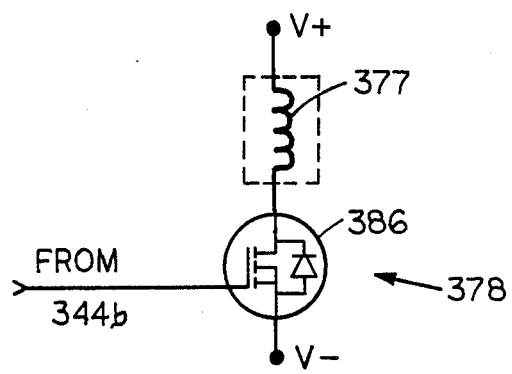
FIG. 28 is a circuit diagram of an additional driver circuit which is used to release a servo motor brake in the preferred embodiment of the present invention as shown in FIG. 27.

Shown in FIG. 28 is the driver circuit 378 which drives current through the coil 376 when the signal at junction 348 is V+. The driver circuit 378 utilizes a power MOSFET 385 operated in common source mode in a manner identical to that of the driver circuit 142.

Figure 29:
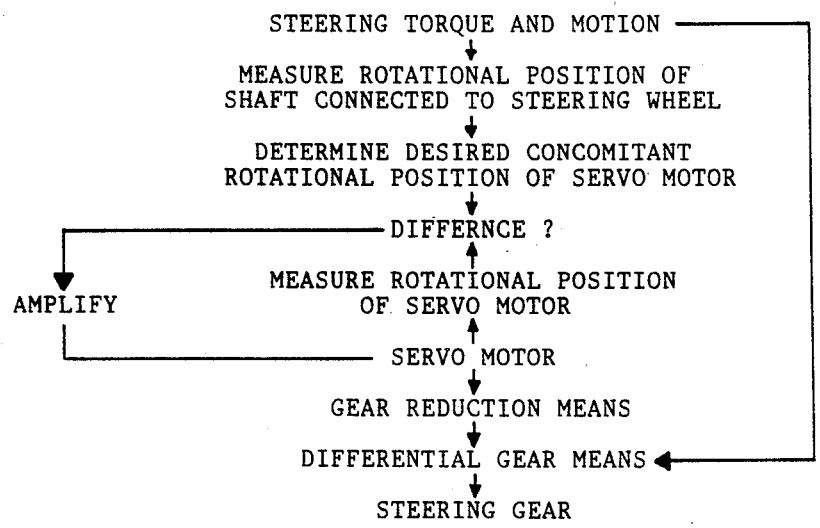
FIG. 29 is a flow chart illustrating a method for controlling an improved power steering system as embodied in the improved power steering system 10.

Shown In FIG. 29 is a flow chart illustrating a method for controlling an improved power steering system as embodied in the improved power steering system 10. In the flow chart of FIG. 29, steering torque and motion is input to differential gear means. Concomitantly, rotational position of a shaft connected to a steering wheel is measured and a desired rotational position of a servo motor is determined. Also concomitantly, actual rotational position of the servo motor is measured and compared with the desired rotational position of the servo motor. Any difference therebetween is amplified and used to drive the servo motor. The output of the servo motor is applied to the differential gear means via gear reduction means. Combined torque and rotational position from the differential gear means are input to a steering gear.

Figure 30A:
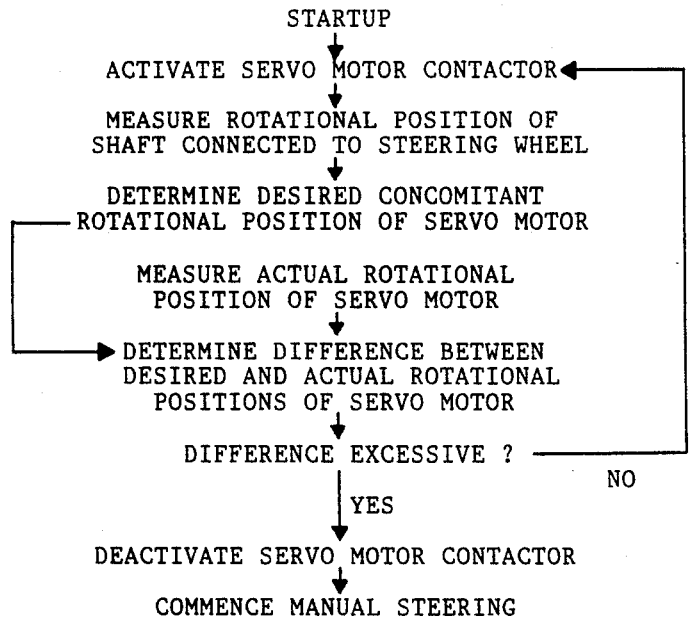
FIG. 30A is a flow chart illustrating a method of providing fail-safe operations of a power steering unit as embodied in eh power steering unit 11.

Shown in FIG. 30A is a flow chart illustrating a method of providing fail-safe operation of a power steering unit as embodied in the power steering unit 11. In the flow chart of FIG. 30A, a servo motor contactor is activated at startup. Rotational position of a shaft connected to a steering wheel is measured and a desired concomitant rotational position of a servo motor is determined. Concomitantly, actual rotational position of the servo motor is measured Any difference between the desired rotational position of the servo motor and the actual rotational position of the servo motor is determined. If the difference is not excessive, the servo motor contactor continues to be activated. If the difference is excessIve, the servo motor contactor is deactIvated and manual steering commences.

Figure 30B:
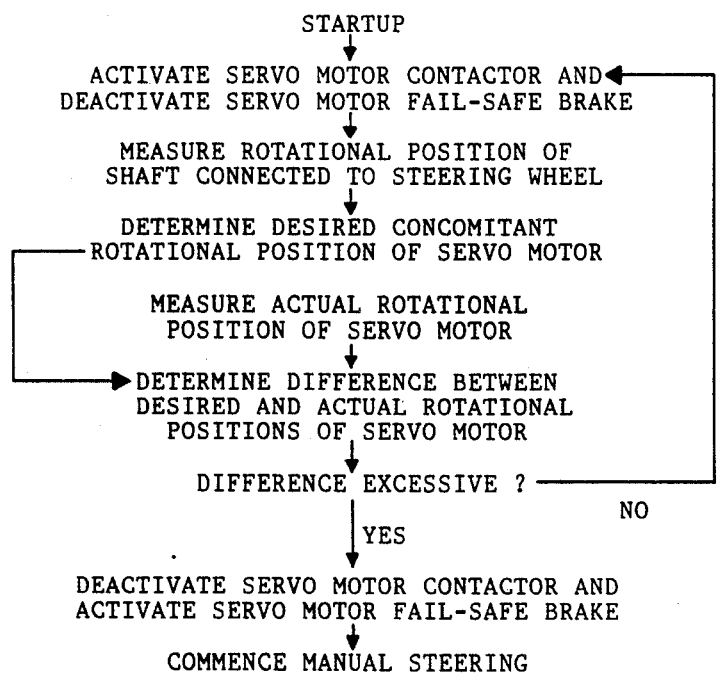
FIG. 30B is a flow chart illustrating a method of providing fail-safe operation of a power steering unit as embodied in the power steering unit 371.

Shown in FIG. 30B is a flow chart illustrating a method of providing fail-safe operation of a power steering unit as embodied in the power steering unit 371. In the flow chart of FIG. 30B, a servo motor contactor is activated and a servo motor fail-safe brake is deactivated at startup. Rotational position of a shaft connected to a steering wheel is measured and a desired concomitant rotational position of the servo motor is determined. Concomitantly, actual rotational position cf the servo motor is measured. Any difference between the desired rotational position of the servo motor and the actual rotational position of the servo motor is determined. If the difference is not excessive, the servo motor contactor continues to be activated and the servo motor fail-safe brake deactivated. If the difference is excessive, the servo motor contactor is deactivated and the servo motor fail-safe brake is activated and manual steering commences.

I claim:

1. A steering assembly for multiplying steering torque and motion applied to a steering wheel of a vehicle by fixed and selectively varying ratios, respectively, said assembly comprising:
input shaft means for coupling steering torque and motion applied to the steering wheel to a sun gear of a planetary gear set,
torque generating means
means for coupling the torque generating means to a ring gear of the planetary gear set,
means for determining rotational motion of the input shaft means, means for controlling rotational motion of the torque generating means in a rotational motion which is a selected function of the rotational motion of the input shaft, means for determining actual rotational motion of the torque generating means, means for terminating rotational motion of the torque generating means if the actual rotational motion of the torque generating means does not substantially match the selected rotational motion, planetary gear and carrier means for receiving output torque and rotational motion from both the sun and ring gears, output shaft means for delivering the output torque and rotational position to a steering gear, whereby steerage of said vehicle is maintained when failure of said torque generating means occurs.

* * * * *

UNITED STATES PATENT AND TRADEMARK OFFICE
CERTIFICATE OF CORRECTION

PATENT NO. : 4,956,590

DATED : Sep. 11, 1990

INVENTOR(S) : Edward H. Phillips

It is certified that error appears in the above-identified patent and that said Letters Patent is hereby corrected as shown below:

Abstract, Line 15, after "the", delete "servo motor" and insert --torque generating means--;

Col. 1, Line 17, after "vehicle", insert --.--;

Col. 1, Line 29, after "vehicle", insert --.--;

Col. 1, Line 33, ":he" should be --the--;

Col. 1, Line 42, ":he" should be --the--;

Col. 2, Line 56, "CHANCING" should be --CHANGING--;

Col. 6, Line 2, "cf" should be --of--;

Col. 6, Line 31, "hysterysis" should be --hysteresis--;

Col. 7, Line 24, "eh" should be --the--;

UNITED STATES PATENT AND TRADEMARK OFFICE
CERTIFICATE OF CORRECTION

PATENT NO. : 4,956,590

DATED : Sep. 11, 1990

INVENTOR(S) : Edward H. Phillips

It is certified that error appears in the above-identified patent and that said Letters Patent is hereby corrected as shown below:

Col. 7, Line 27, "371" should be --11--;

Col. 10, Lines 23 and 24, "Rearing" should be --Bearing--;

Col. 12, Lines 31 and 32, "rail-safe" should be --fail-safe--;

Col. 13, Line 33, "syncronized" should be --synchronized--;

Col. 13, Line 54, after "51", insert --is--;

Col. 13, Line 60, "attendent" should be --attendant--;

Col. 14, Line 11, "68" should be --6B--;

Col. 19, Line 49, "resPectively" should be --respectively--;

Col. 20, Line 2, "satisfiy" should be --satisfy--;

Col. 20, Line 21, "rotatonal" should be --rotational--;

UNITED STATES PATENT AND TRADEMARK OFFICE
CERTIFICATE OF CORRECTION

PATENT NO. : 4,956,590

DATED : Sep. 11, 1990

INVENTOR(S) : Edward H. Phillips

It is certified that error appears in the above-identified patent and that said Letters Patent is hereby corrected as shown below:

Col. 20, Line 58, "0185" should be --C185--;

Col. 21, Lines 20 and 21, "expressIon" should be --expression--;

Col. 21, Line 21, "R190R194C193/R190 + R194)" should be --R190R194C193/(R190 + R194)--;

Col. 21, Line 24, "gaIn" should be --gain--;

Col. 21, Line 31, "electrial" should be --electrical--;

Col. 22, Line 36, "18R" should be --18B--;

Col. 22, Line 68, "amPlifier" should be --amplifier--;

Col. 23, Line 38, "C/R = G/(1 + CH)" should be --C/R = G/(1 + GH)--;

Col. 24, Lines 13 and 14, "comPared" should be --compared--;

UNITED STATES PATENT AND TRADEMARK OFFICE
CERTIFICATE OF CORRECTION

PATENT NO. : 4,956,590

DATED : Sep. 11, 1990

INVENTOR(S) : Edward H. Phillips

It is certified that error appears in the above-identified patent and that said Letters Patent is hereby corrected as shown below:

Col. 24, Line 28, "Positive" should be --positive--;

Col. 24, Line 62, "gaIn" should be --gain--;

Col. 25, Line 3, "brige" should be --bridge--;

Col. 25, Line 35, "I274 (1 - 0)" should be --I274(10)--;

Col. 25, Lines 59 and 60, "determIned" should be --determined--;

Col. 26, Line 10, "Nsg" should be --NTsg--;

Col. 26, Line 57, "imPedance" should be --impedance--;

Col. 27, Line 59, "junctIon" should be --junction--;

Col. 28, Line 32, "D336," should be --D336.--;

Col. 29, Line 39, "268" should be --26B--;

UNITED STATES PATENT AND TRADEMARK OFFICE
CERTIFICATE OF CORRECTION

PATENT NO. : 4,956,590

DATED : Sep. 11, 1990

INVENTOR(S) : Edward H. Phillips

It is certified that error appears in the above-identified patent and that said Letters Patent is hereby corrected as shown below:

Col. 29, Line 57, "Power" should be --power--;

Col. 29, Line 67, "0361" should be --D361--;

Col. 30, Line 35, "accomodated" should be --accommodated--;

Col. 30, Line 65, "mInimize" should be --minimize--;

Col. 32, Line 35, "excessIve" should be --excessive--;

Col. 32, Lines 35 and 36, "deactIvated" should be --deactivated--.

Signed and Sealed this

First Day of December, 1992

Attest:

DOUGLAS B. COMER

*Attesting Officer*  *Acting Commissioner of Patents and Trademarks*